US011906962B2

(12) United States Patent
Pu et al.

(10) Patent No.: US 11,906,962 B2
(45) Date of Patent: Feb. 20, 2024

(54) UNMANNED AERIAL VEHICLE TRACKING AND CONTROL

(71) Applicant: Apple Inc., Cupertino, CA (US)

(72) Inventors: Han Pu, Hong Kong (HK); Alosious Pradeep Prabhakar, Singapore (SG); Krisztian Kiss, Hayward, CA (US); Srinivasan Nimmala, San Jose, CA (US); Vijay Venkataraman, San Jose, CA (US); Yip Pong Herbert Wong, Hong Kong (HK)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 17/182,917

(22) Filed: Feb. 23, 2021

(65) Prior Publication Data

US 2021/0349458 A1    Nov. 11, 2021

(30) Foreign Application Priority Data

Mar. 11, 2020    (SG) .......................... 10202002204W

(51) Int. Cl.
*G05D 1/00* (2006.01)
*B64C 39/02* (2023.01)
(Continued)

(52) U.S. Cl.
CPC ......... *G05D 1/0022* (2013.01); *B64C 39/024* (2013.01); *G01S 19/42* (2013.01);
(Continued)

(58) Field of Classification Search
CPC .... G05D 1/0022; G05D 1/101; B64C 39/024; G01S 19/42; G08G 5/0095; G08G 5/0013;
(Continued)

(56) References Cited

U.S. PATENT DOCUMENTS 9,990,854 B1 *   6/2018   Elmasry ............... G08G 5/0026
10,650,683 B2 *  5/2020   Zelenka ............... G08G 5/0008
(Continued)

FOREIGN PATENT DOCUMENTS

KR      2013039907 A  *   4/2013   ............ H04W 28/24
WO   WO-2009118071 A1 *  10/2009   ............ H04W 60/04
(Continued)

*Primary Examiner* — Peter D Nolan
*Assistant Examiner* — Peter Y Ning
(74) *Attorney, Agent, or Firm* — Kowert, Hood, Munyon, Rankin & Goetzel, P.C.

(57) ABSTRACT

Apparatuses, systems, and methods for tracking and/or controlling unmanned aerial vehicles (UAVs) as well as tracking UAV controllers (UACs) within a cellular network. A UAV/UAC may provide a cellular network with tracking information such as speed, orientation, altitude, C2 communication quality, C2 communication mode change request, measurement report, RRC status, cell ID, TAC ID, current location of the UAV, and destination of the UAV. The network may forward this information to an unmanned aerial system (UAS) traffic management system (UTM). The UTM may determine, based in part on the tracking information, whether to transfer control of the UAV from the UAC to the UTM. In some embodiments, the UAV/UAC may trigger the UTM to transfer control of the UAV form the UAC to the UTM.

20 Claims, 23 Drawing Sheets

(51) Int. Cl.
  *G05D 1/10*     (2006.01)
  *G01S 19/42*    (2010.01)
  *G08G 5/00*     (2006.01)
  *H04W 84/04*    (2009.01)
  *B64U 10/25*    (2023.01)

(52) U.S. Cl.
  CPC ........... *G05D 1/101* (2013.01); *G08G 5/0095* (2013.01); *B64U 10/25* (2023.01); *B64U 2201/20* (2023.01); *H04W 84/042* (2013.01)

(58) Field of Classification Search
  CPC .. G08G 5/0026; G08G 5/0043; G08G 5/0052; G08G 5/0069; G08G 5/0082; B64U 10/25; B64U 2201/20; B64U 10/13; H04W 84/042; H04W 4/027; H04W 60/005; H04W 4/025; H04W 4/40
  See application file for complete search history.

(56) References Cited

U.S. PATENT DOCUMENTS

| | | | |
|---|---|---|---|
| 10,952,113 B2 * | 3/2021 | Mahkonen | H04W 36/00835 |
| 11,051,185 B2 * | 6/2021 | Määttanen | H04W 24/02 |
| 11,166,208 B2 * | 11/2021 | Takács | H04W 36/00837 |
| 11,445,510 B2 * | 9/2022 | Takács | G08G 5/0013 |
| 11,474,539 B2 * | 10/2022 | Mahkonen | G08G 5/0039 |
| 2008/0198871 A1 * | 8/2008 | Shahidi | H04L 69/28 370/252 |
| 2016/0275801 A1 * | 9/2016 | Kopardekar | G08G 5/0082 |
| 2018/0090012 A1 * | 3/2018 | Jo | G08G 5/0078 |
| 2018/0324881 A1 * | 11/2018 | Gagne | H04W 76/14 |
| 2019/0080142 A1 * | 3/2019 | Abeywardena | G01C 21/32 |
| 2020/0162449 A1 * | 5/2020 | Nagao | H04W 4/02 |
| 2020/0250993 A1 * | 8/2020 | Li | G08G 5/006 |
| 2021/0241634 A1 * | 8/2021 | Sarim | G08G 5/0013 |
| 2021/0274311 A1 * | 9/2021 | Mahkonen | B64C 39/024 |
| 2021/0314112 A1 * | 10/2021 | Balasubramanian | H04L 5/001 |
| 2021/0329460 A1 * | 10/2021 | Liao | H04L 63/0892 |
| 2021/0349458 A1 * | 11/2021 | Pu | H04W 4/40 |
| 2022/0086741 A1 * | 3/2022 | Liao | H04W 4/44 |
| 2022/0277657 A1 * | 9/2022 | Xiang | H04W 12/68 |
| 2022/0394500 A1 * | 12/2022 | Geng | G08G 5/006 |
| 2023/0232204 A1 * | 7/2023 | Ryu | H04W 8/18 370/329 |
| 2023/0239724 A1 * | 7/2023 | Pateromichelakis | H04B 7/18506 370/230 |

FOREIGN PATENT DOCUMENTS

| | | | | |
|---|---|---|---|---|
| WO | WO-2018189576 A1 * | 10/2018 | | B64C 39/024 |
| WO | WO-2021041214 A1 * | 3/2021 | | H04W 12/068 |

* cited by examiner

UNMANNED AERIAL VEHICLE TRACKING AND CONTROL

PRIORITY CLAIM

This application claims benefit of priority to Singapore Application No. 10202002204W, titled "Unmanned Aerial Vehicle Tracking and Control", filed Mar. 11, 2020, which is hereby incorporated by reference in its entirety as though fully and completely set forth herein.

FIELD

The invention relates to unmanned aerial vehicles (UAVs), and more particularly to a system and method for tracking and/or controlling of UAVs in a cellular network system.

DESCRIPTION OF THE RELATED ART

Unmanned aerial vehicles, also referred to as drones, may be characterized as mobile devices or systems that are used for various applications, such as acquiring or sensing information (e.g., video acquisition or surveillance), delivering goods, or other activities. The usage of UAVs has rapidly increased in recent years, in part due to the many applications in which they can be used. For example, UAVs may be utilized to travel to remote, inaccessible, and/or inconvenient locations to perform various actions. In some applications, a UAV is controlled by a human user (e.g., a user on the ground), where the user uses a UAV controller (UAC) to remotely control the operation of the UAV. In some implementations, the UAC may communicate with the UAV over an existing cellular network. One issue that may arise is what information may be required for the existing cellular network to track and/or control the UAV and/or how to track the UAC. Therefore, improvements in the field are desired.

SUMMARY

Embodiments relate to apparatuses, systems, and methods for tracking and/or controlling unmanned aerial vehicles (UAVs) as well as tracking UAV controllers (UACs) within a cellular network. Embodiments may include various methods for a UAV/UAC to provide a cellular network with tracking information such as speed, orientation, altitude, C2 communication quality, Cell ID, TAC ID, current location of the UAV, and destination of the UAV. The tracking information may be provided either periodically or may be event triggered, e.g., based on certain thresholds obtaining or being met. The network may forward this information to an unmanned aerial system (UAS) traffic management entity (UTM). The UTM may determine, based in part on the tracking information, whether to transfer control of the UAV from the UAC to the UTM. In some embodiments, the UAV/UAC may trigger the UTM to transfer control of the UAV form the UAC to the UTM. For example, a UTM may receive, from a network entity, tracking information associated with the UAV and/or a UAC associated with the UAV, wherein the UAV is in a Network-Assisted control mode, and wherein the tracking information includes at least one of a UAV identifier (UAV ID) associated with the UAV or a UAC identifier (UAC ID) associated with the UAC. The UTM may determine, based on the tracking information associated with the UAV, to switch the UAV from the Network-Assisted control mode to a UTM-Navigated control mode and may send, to the network entity, a control mode change request, wherein the control mode change request includes at least one of the UAV ID or UAC ID.

As another example, a UAV may send, to a network entity, tracking information associated with the UAV and/or a UAC associated with the UAV, wherein the UAV is in a Network-Assisted control mode, and wherein the tracking information includes at least one of a UAV identifier (UAV ID) associated with the UAV or a UAC identifier (UAC ID) associated with the UAC. The UAV may receive, from the network entity, a control mode change request indicating a switch of the UAV from the Network-Assisted control mode to a UTM-Navigated control mode, wherein the control mode change request includes at least one of the UAV ID or UAC ID. The UAV may send, to the network entity, a control mode change confirmation, wherein the control mode change request includes at least one of the UAV ID or UAC ID.

As a further example, a UAC associated with a UAV may send, to a network entity, tracking information associated with the UAV and/or the UAC, wherein the UAV is in a Network-Assisted control mode, and wherein the tracking information includes at least one of a UAV identifier (UAV ID) associated with the UAV or a UAC identifier (UAC ID) associated with the UAC. The UAC may receive, from the network entity, a control mode change request indicating a switch of the UAV from the Network-Assisted control mode to a UTM-Navigated control mode, wherein the control mode change request includes at least one of the UAV ID or UAC ID. The UAC may send, to the network entity, a control mode change confirmation, wherein the control mode change request includes at least one of the UAV ID or UAC ID.

As another example, a network entity may receive, from a UAV and/or a UAC associated with the UAV, tracking information associated with the UAV, wherein the UAV is in a Network-Assisted control mode, and wherein the tracking information includes at least one of a UAV identifier (UAV ID) associated with the UAV or a UAC identifier (UAC ID) associated with the UAC. The network entity may send, to the UTM, the tracking information associated with the UAV and may receive, from the UTM, a control mode change request indicating a switch of the UAV from the Network-Assisted control mode to a UTM-Navigated control mode, wherein the control mode change request includes at least one of the UAV ID or UAC ID. The network entity may send, to the UAV and/or UAC, the control mode change request and may receive, from the UAV and/or UAC, a control mode change confirmation, wherein the control mode change confirmation includes at least one of the UAV ID or UAC ID. The network entity may send, to the UTM, the control mode change confirmation.

As yet another example, a Third Party Authorized Entity (TPAE) may receive, from a UTM, tracking information associated with the UAV and/or a UAV controller (UAC) associated with the UAV, wherein the UAV is in a Network-Assisted control mode, and wherein the tracking information includes at least one of a UAV identifier (UAV ID) associated with the UAV or a UAC identifier (UAC ID) associated with the UAC. The TPAE may determine, based on the tracking information associated with the UAV, to switch the UAV from the Network-Assisted control mode to a UTM-Navigated control mode and may send, to the UTM, a control mode change request, wherein the control mode change request includes at least one of the UAV ID or UAC ID.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
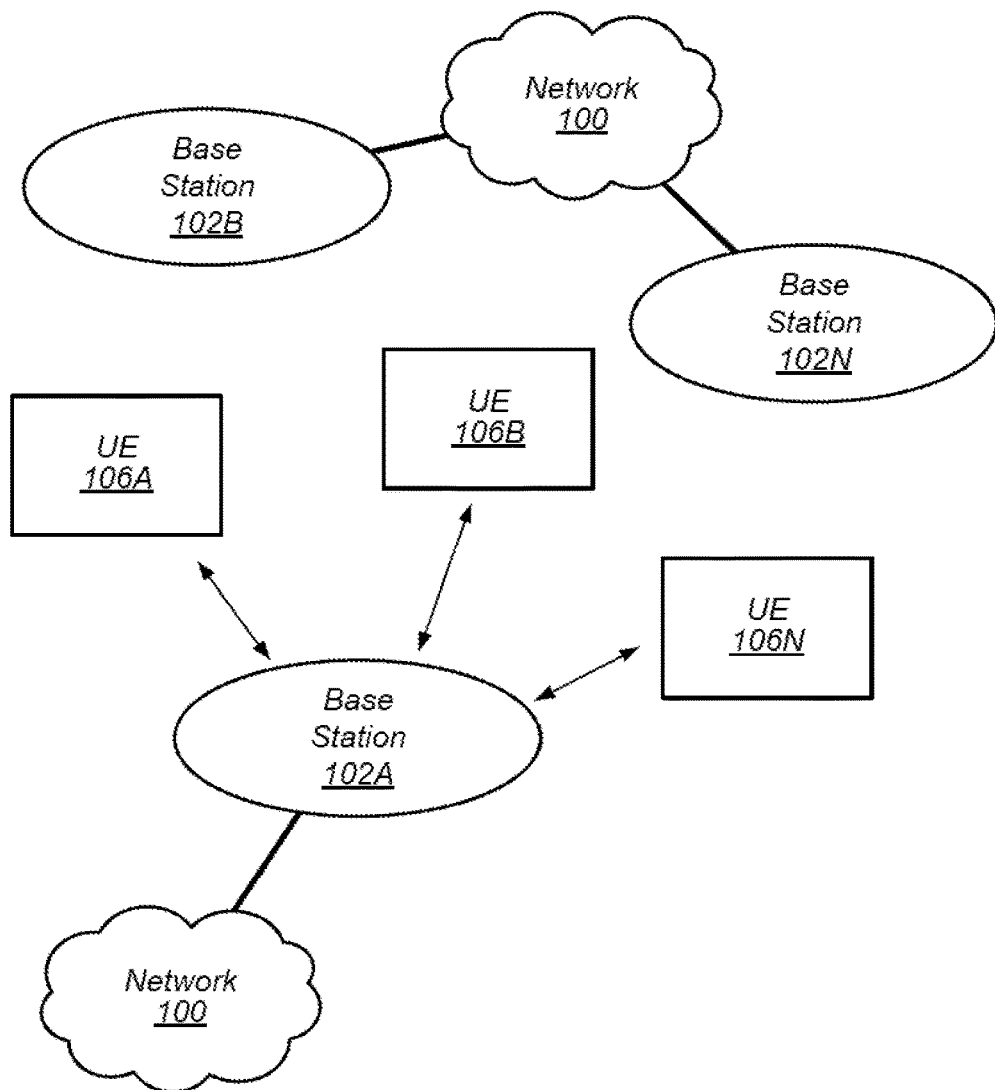
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UAV: Unmanned Aerial Vehicle
UAC: Unmanned Aerial Controller
UAS: Unmanned Aerial System
UTM: UAS Traffic Management
C2: Command and Control
BLOS: Beyond Line of Sight
3GPP: Third Generation Partnership Project
TPAE: Third Party Authorized Entity
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GCN: 5G Core Network
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Unmanned Aerial Vehicle (UAV)—any of various types of unmanned devices or systems capable of aerial operation (flight). UAVs are also commonly referred to as "drones". The term "UAV" has the full extent of its ordinary meaning.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
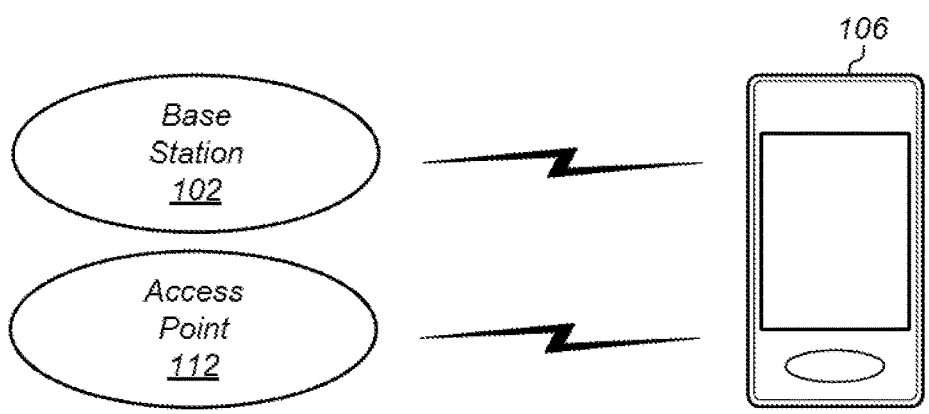
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
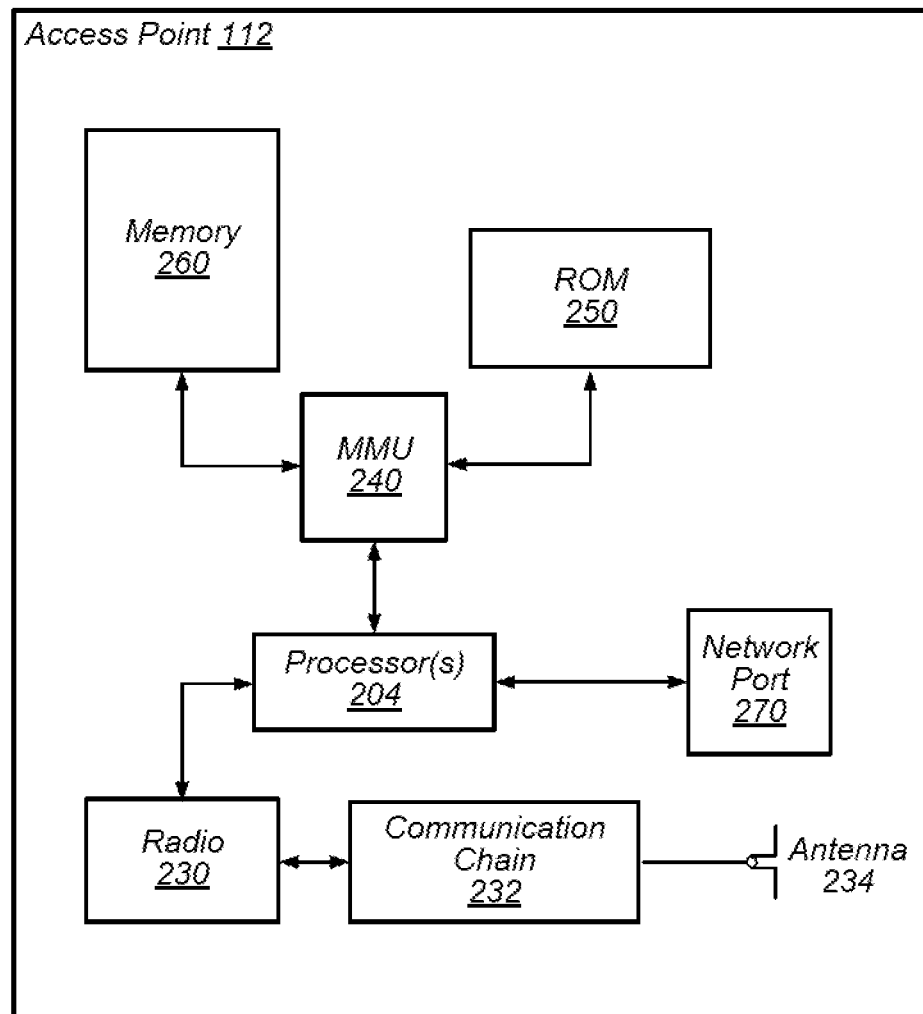
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for tracking and/or controlling unmanned aerial vehicles (UAVs) as well as tracking UAV controllers (UACs) within a cellular network as further described herein.

Figure 3:
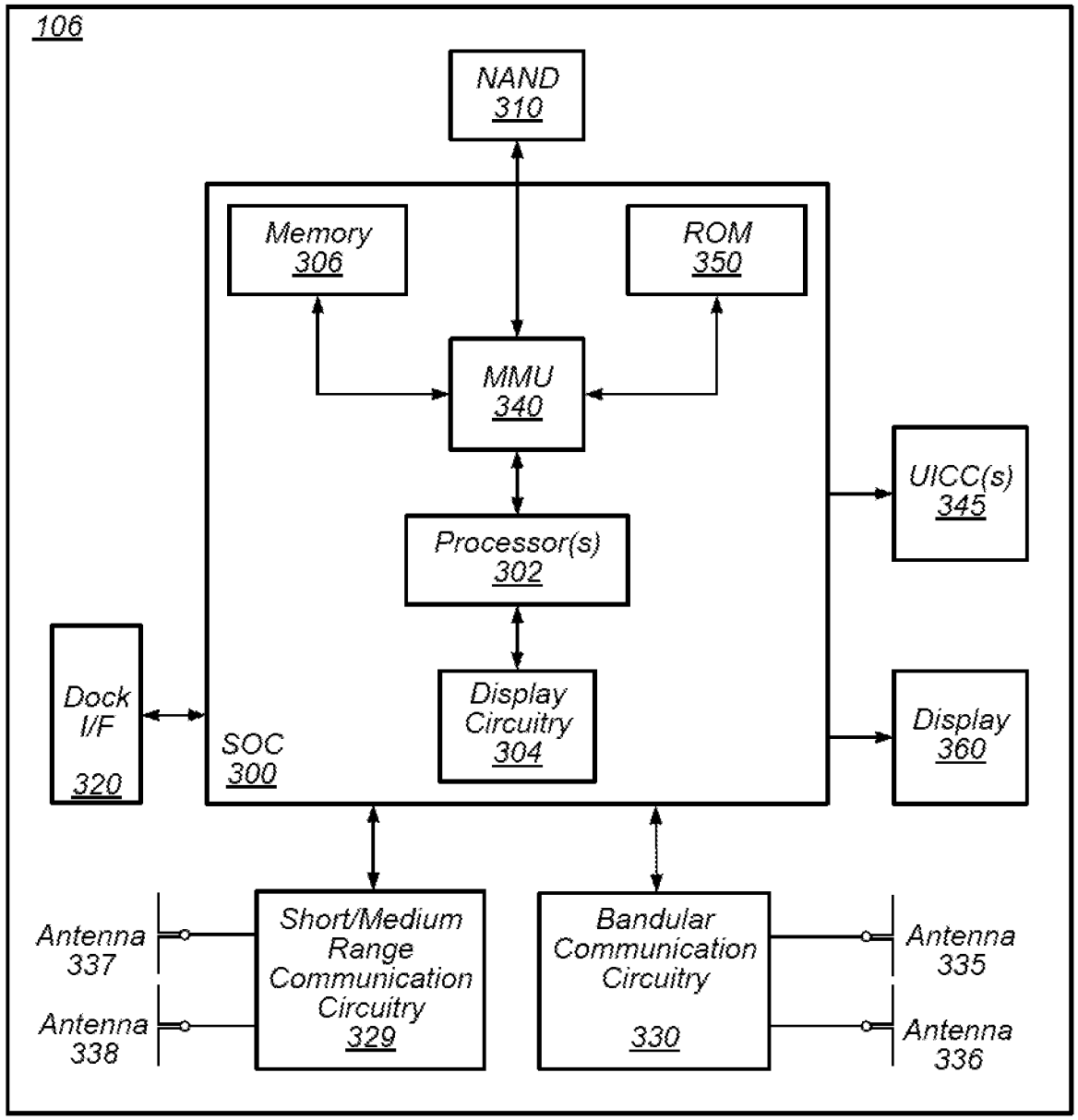
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMS. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for tracking and/or controlling unmanned aerial vehicles (UAVs) as well as tracking UAV controllers (UACs) within a cellular network as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
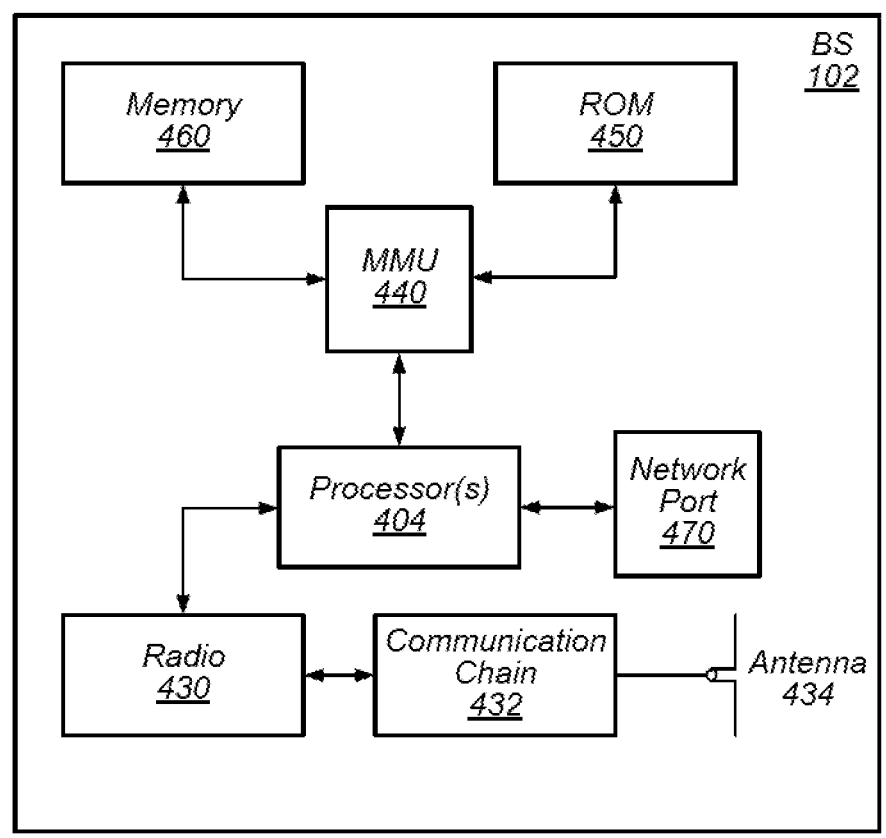
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
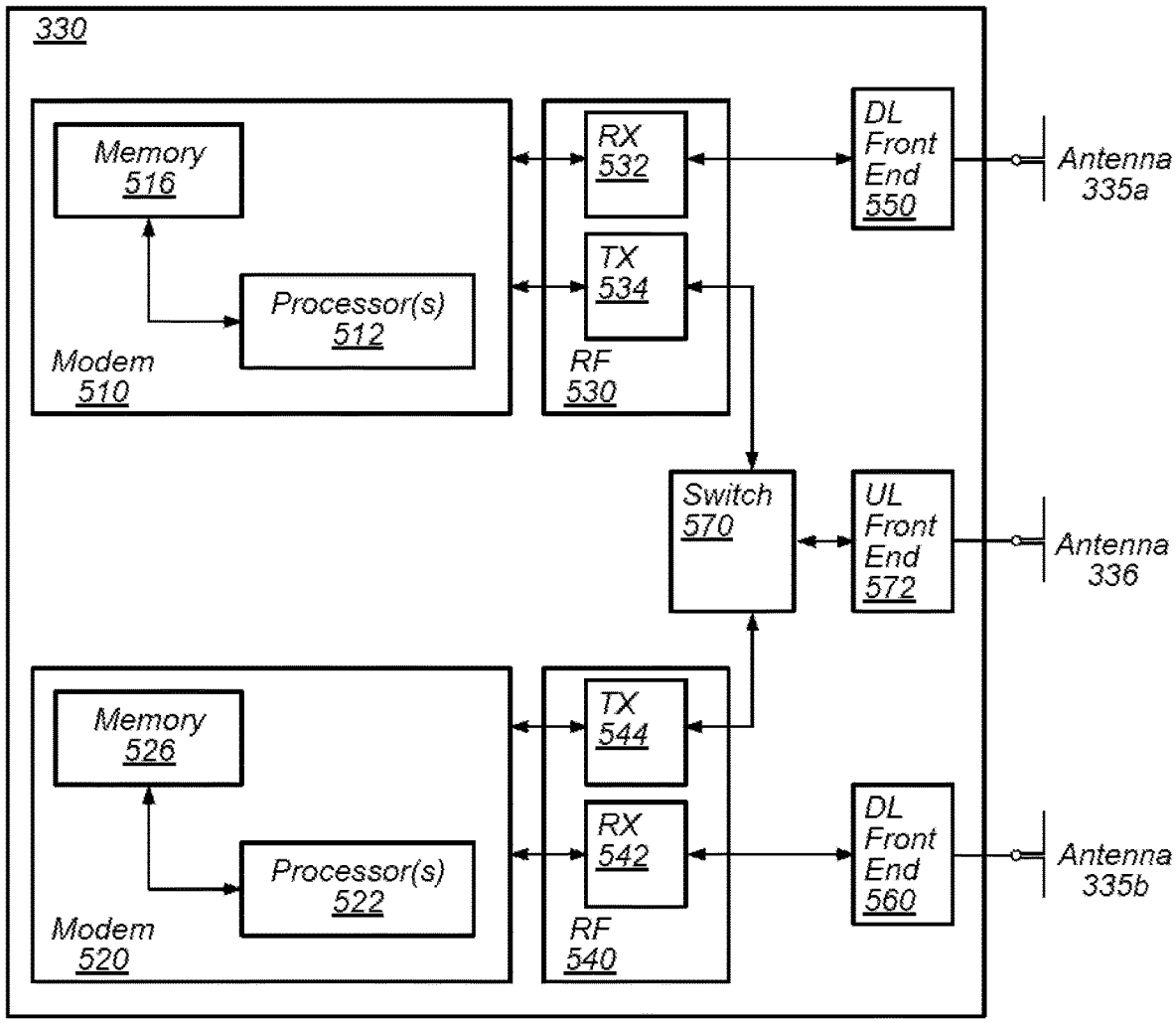
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods tracking and/or controlling unmanned aerial vehicles (UAVs) as well as tracking UAV controllers (UACs) within a cellular network as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
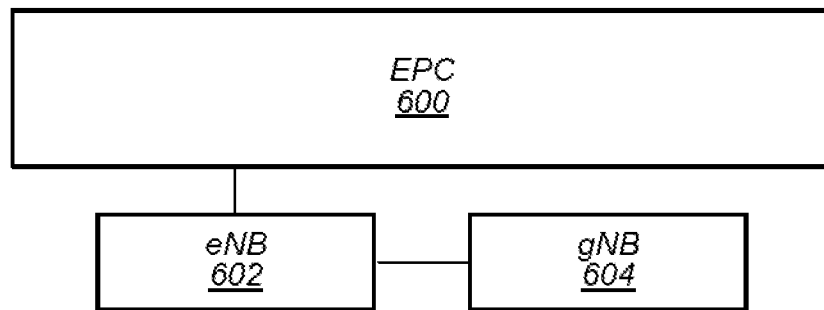
FIG. 6A illustrates an example of connections between an EPC network, an LTE base station (eNB), and a 5G NR base station (gNB).
Figure 6B:
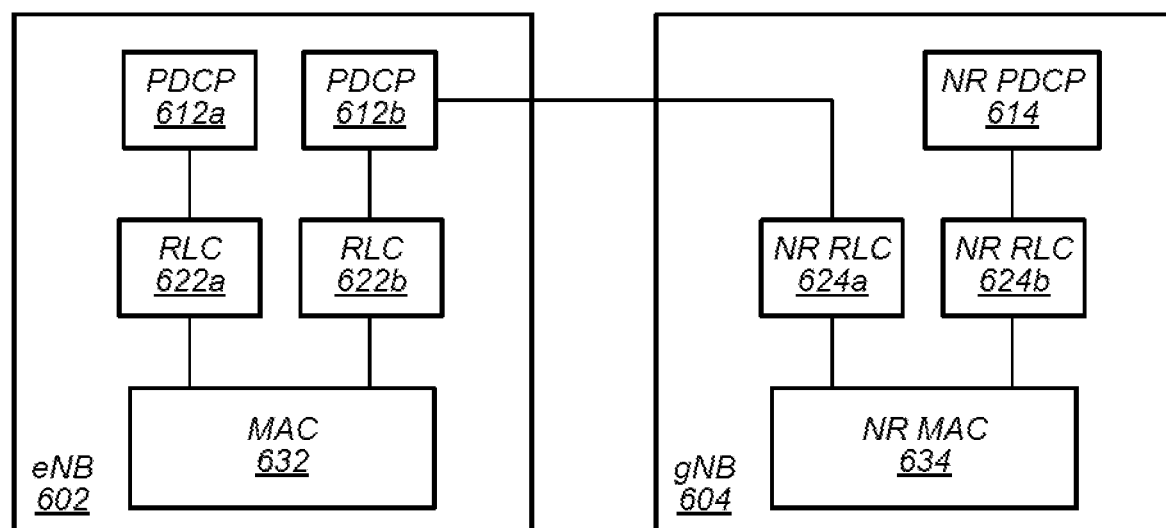
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
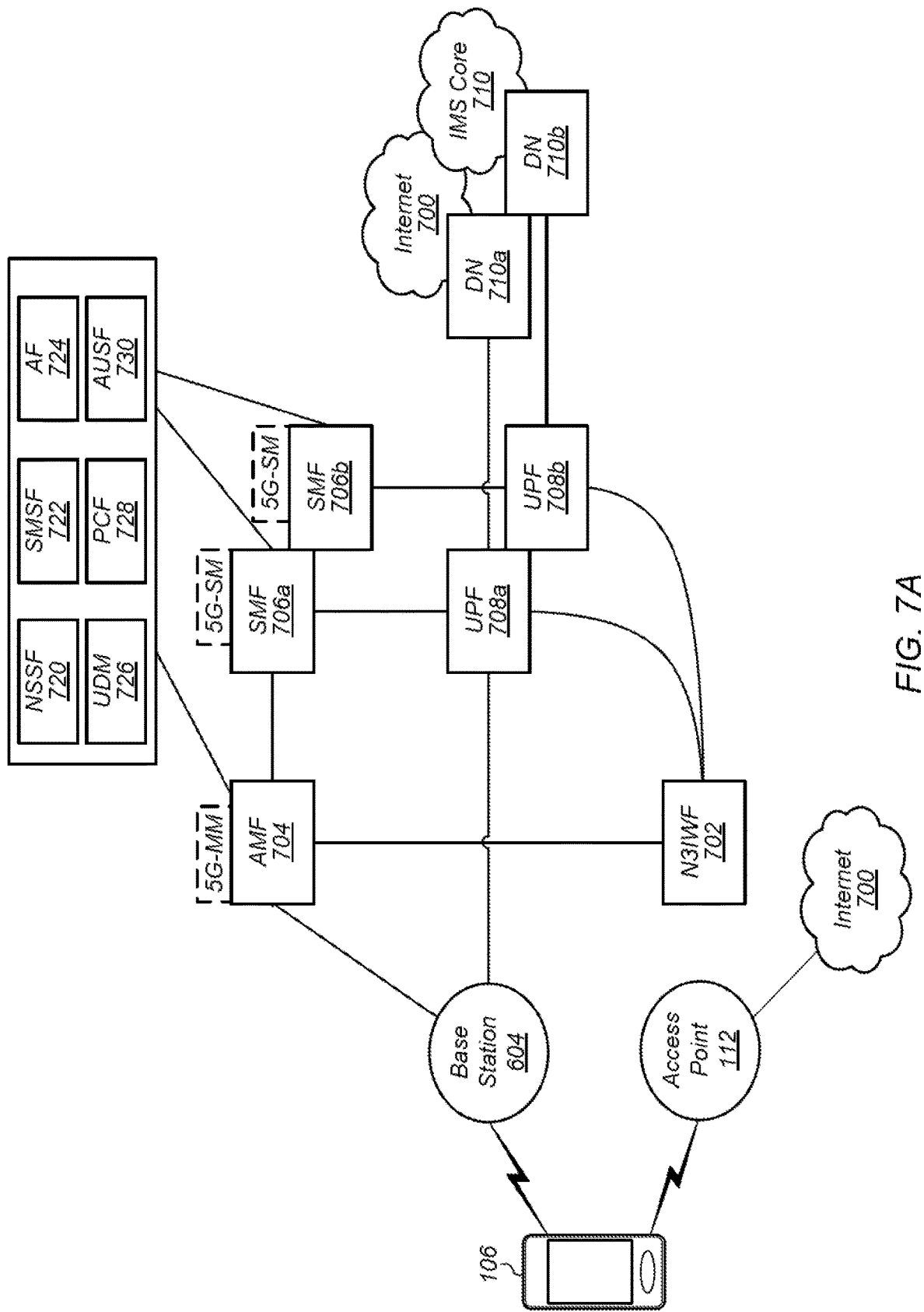
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
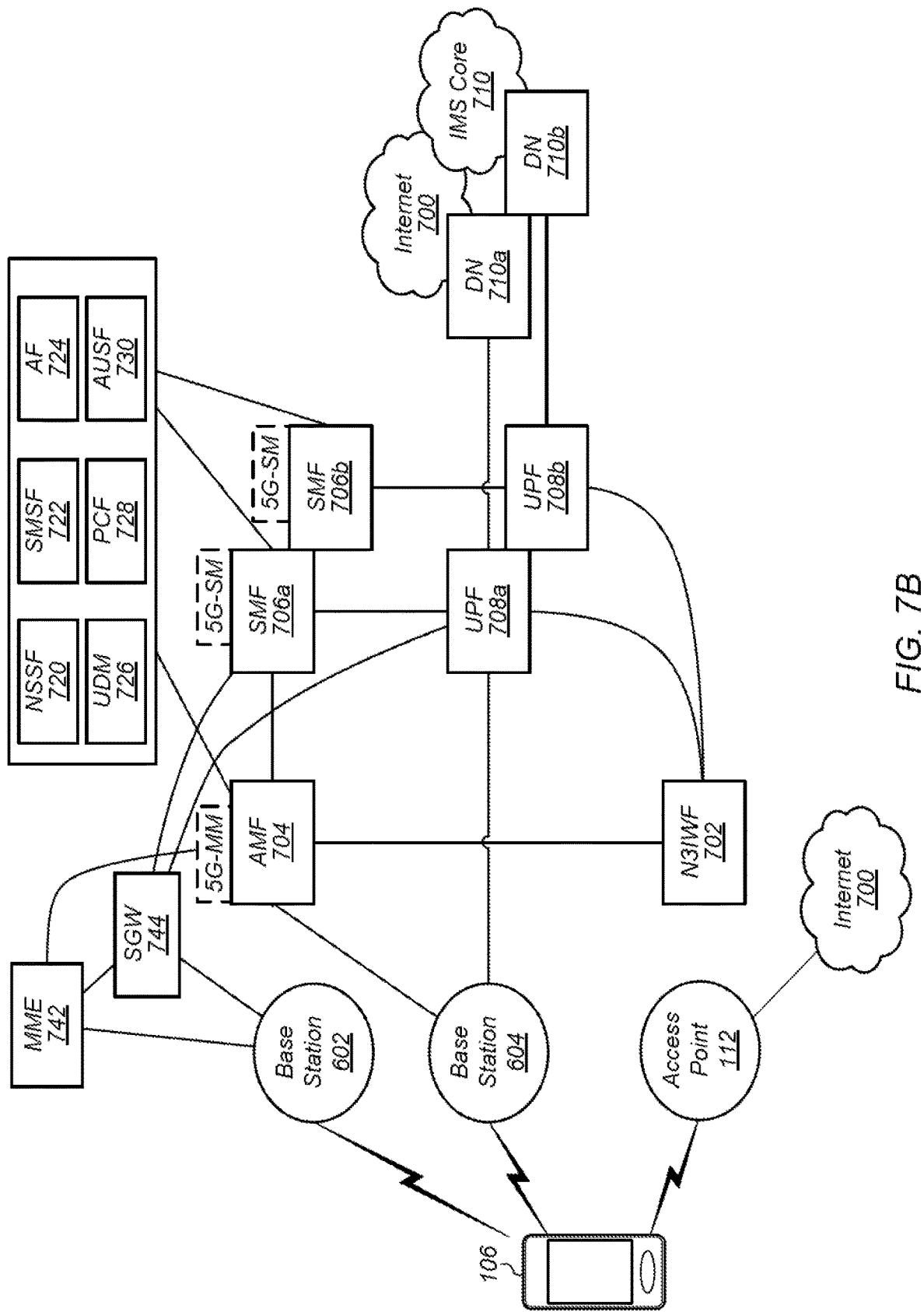
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms tracking and/or controlling unmanned aerial vehicles (UAVs) as well as tracking UAV controllers (UACs) within a cellular network, e.g., as further described herein.

Figure 8:
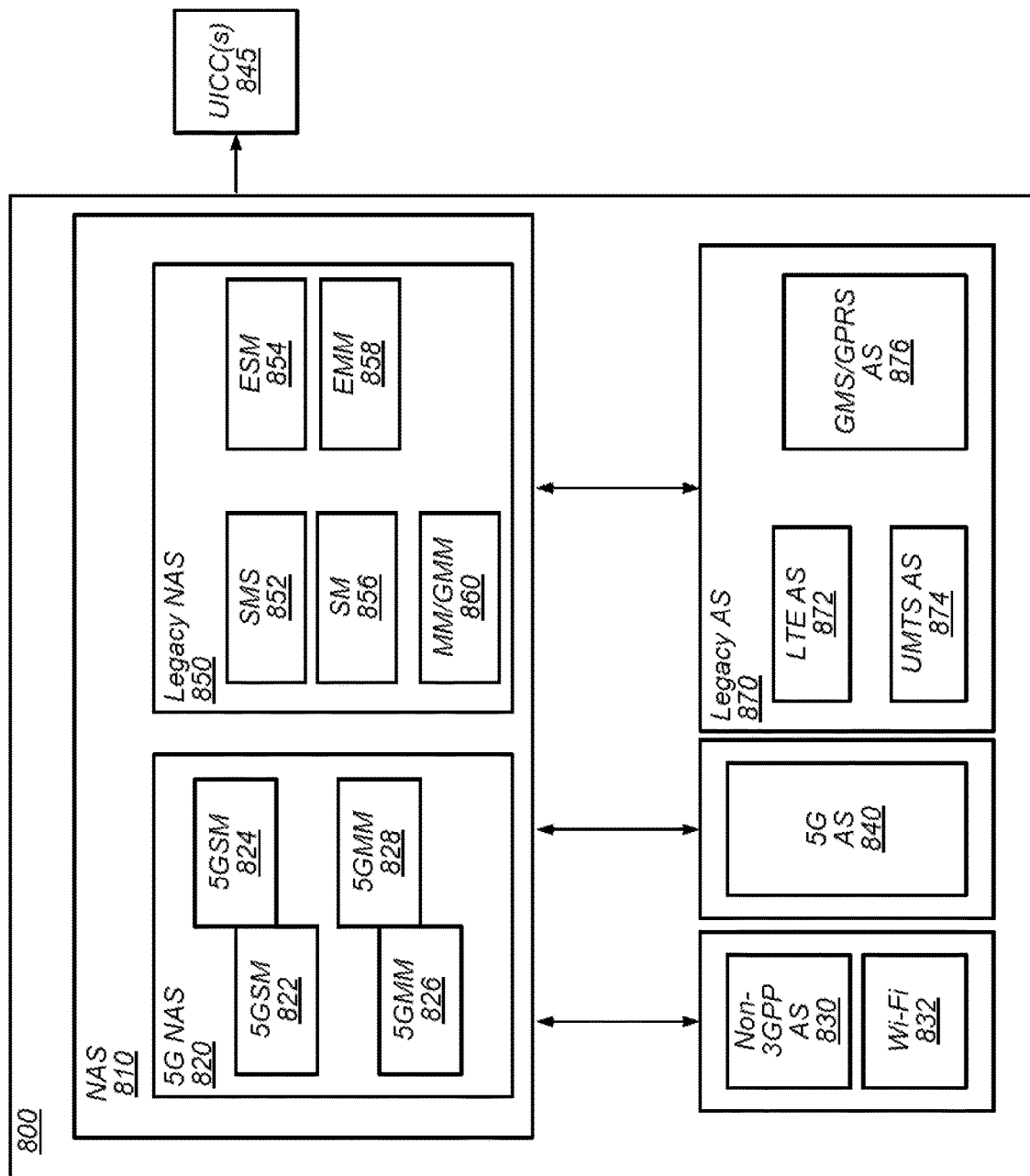
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods tracking and/or controlling unmanned aerial vehicles (UAVs) as well as tracking UAV controllers (UACs) within a cellular network, e.g., as further described herein.

Figure 9:
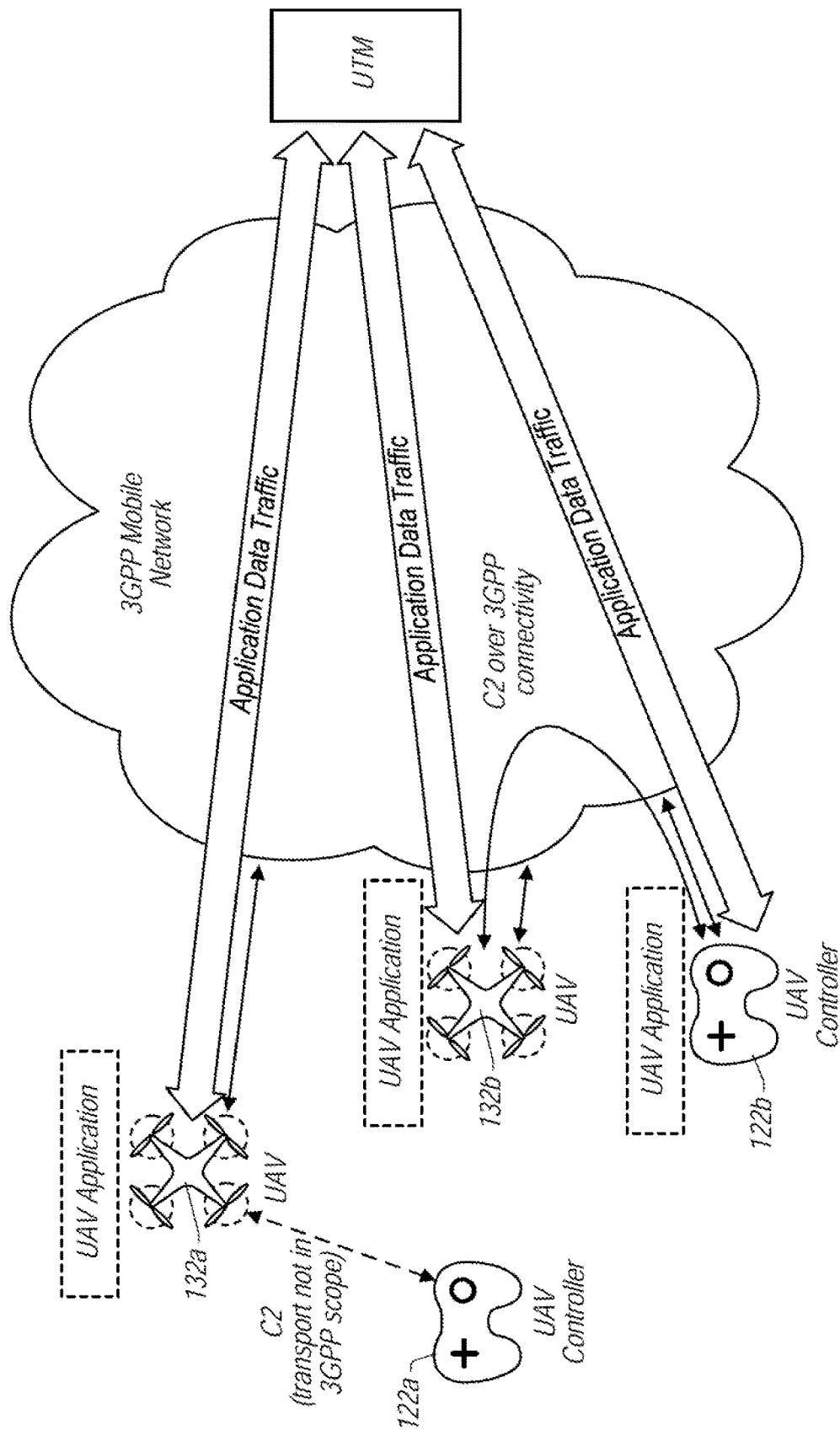
FIG. 9 illustrates an unmanned aerial system operating in a cellular network, such as a 3GPP network, according to some embodiments.

FIG. 9—Example Unmanned Aerial System

FIG. 9 illustrates an example (and simplified) block diagram of unmanned aerial system (UAS) in which aspects of this disclosure may be implemented, according to some embodiments. It is noted that the system of FIG. 9 is merely one example of a possible system, and embodiments may be implemented in any of various systems, as desired.

As shown, the example UAS includes one or more unmanned aerial vehicles (UAVs), a first UAV 132a and a second UAV 132b. The first UAV 132a may be controlled by a first UAV controller 122a operated by a user, and one or both of the first and second UAVs 132a and 132b may be controlled by a second UAV controller 122b operated by a user. The controllers 122a and 122b may transmit command and control (C2) signals to the UAV's to control their operation, e.g., to control their movement. Example C2 signals include signals to steer the UAV's, to move the UAV up or down, to adjust the speed of the UAV's, etc. Each of the UACs (controllers) may be implemented as a UE, such as UE 106 as described above.

When using the cellular network (3GPP network) as the transport network for supporting UAS services, the system may utilize one or more of three different C2 communication methods to provision UAS services, which may include guaranteeing QoS for the C2 communication. These three different C2 communication methods may be referred to as Direct C2 Communication, Network-Assisted C2 Communication, and UTM-Navigated C2 Communication. Each of these is described below.

Direct C2 Communication: The UAV controller and UAV establish a direct C2 link to communicate with each other and both are registered to the 5G network using a radio resource configured and scheduled provided by the 5G network for direct C2 communication. This is shown in the left side of FIG. 9, where in some implementations the first UAV controller 122a may communicate command and control (C2) radio signals directly with its respective UAV 132a, as indicated by the note "C2 transport not in 3GPP scope". Thus, the UAV controller 122a transmits radio signals that are received directly by the UAV 132a, and similarly the UAV 132a transmits radio signals that are received directly by the UAV controller 122a (direct C2 link). This method of direct communication between the controller 122a and the UAV 132a may be useable when the controller 122a and the UAV 132a are within line of sight of each other and are sufficiently close to one another. This would be a typical scenario where a user is controlling a drone that is close to the user (e.g., within short-range radio transmission range) and within the user's line of sight.

Network-Assisted C2 Communication: The UAV controller and UAV register and establish respective unicast C2 communication links to the cellular network (5G network) and communicate with each other via the cellular network. Also, both the UAV controller and UAV may be registered to the cellular network via different NG-RAN nodes. Here it is presumed that the cellular network supports a mechanism to handle the reliable routing of C2 communication. This is shown in the middle of FIG. 9, where the UAV controller 122b communicates C2 signals with its respective UAV 132b using a cellular network, as indicated by the note "C2 over 3GPP connectivity". Thus, as shown, the UAV controller 122b transmits command and control (C2) radio signals that are received by a cellular network (e.g., a base station 102 of a cellular network), and the cellular network then transmits corresponding C2 radio signals to one or both of the UAVs 132a and 132b. In a similar manner, one of the UAVs may transmit C2 radio signals that are received by the cellular network (e.g., a base station 102 of a cellular network), and the cellular network then transmits corresponding radio signals to one or both of the other UAV or to UAV controller 122b.

Thus, the first UAV controller 122a communicates with its UAV 132a using direct radio signaling (without using the cellular network) referred to as "Direct C2 Communication", while the second UAV controller 122b communicates with one or more UAVs (e.g., UAVs 132a and 132b) using an intermediate cellular network to facilitate the communication, referred to as "Network-Assisted C2 Communication".

UTM-Navigated C2 Communication: This communication method also utilizes the cellular network, where the UAV controller and UAV register and establish respective C2 communication links to the cellular network (5G network) and communicate with each other via the cellular network. In this method, the UAV may have an associated controller, but the UTM may be able to take control of the UAV at any time. The UAV may have been provided a pre-scheduled flight plan, e.g., an array of 4D polygons describing a path in the cellular network, for autonomous flying. In this communication method, the UTM maintains a C2 communication link with the UAV in order to regularly monitor the flight status of the UAV, verify the flight status with up-to-date dynamic restrictions, provide route updates, and navigate the UAV whenever necessary. Thus, the UTM may control the flight of the UAV, including the flight path, the height at which the UAV may travel, the speed of the UAV, etc. This is shown in FIG. 9 as the "Application Data Traffic" that is transmitted between the UAS Traffic Management (UTM) and each of the UAV 132a, UAV 132b and the controller 122b. The term "Application Data Traffic" in FIG. 9 may refer to command and control (C2) signals provided between the UTM and one or more of the UAV 132a, UAV 132b and the controller 122b. One example of where the UTM may take over UAV operations is when there is an attempt by the UAV and/or its controller to violate a previously approved flight authorization.

In general, Direct C2 communication and Network-Assisted C2 communication may be used by a human-operator using a UAV controller. UTM-Navigated C2 communication may be used by the UTM to provide cleared flying routes and routes updates, which may not involve a human operator. In other words, UTM-Navigated C2 communication may involve autonomous flying operation of the UAV. In order to ensure the service availability and reliability of the C2 communication for UAS operation, especially when the UAV is flying beyond line of sight (BLOS) of the operator, redundant C2 communication links can be established for any C2 communication links from the UAV controller or UTM to the UAV.

One or more, and preferably each, of the second UAV controller 122b, the UAC 122a, and the UAV 132b may store and execute UAV applications for performing a desired function, as shown. Accordingly, the second UAV controller 122b and the UAVs 132a and 132b may transmit application data traffic back and forth amongst each other using the cellular network.

The cellular network is conceptually illustrated as a cloud labeled "3GPP Mobile Network", although it is noted that any of various types of cellular networks may be used. The cellular network may include a plurality of base stations, where at least one base station 102 communicates over a wireless transmission medium with one or more (e.g., an arbitrary number of) UAVs and/or UAV controllers. The cellular network base stations may also be configured to communicate with various other cellular user equipment (UE) devices, such as cell phones, tablets, etc.

The base station 102 may be a base transceiver station (BTS) or cell site, and may include hardware and/or software that enables wireless communication with UEs, including UAVs and UAV controllers. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network (e.g., a core network of a cellular service provider, a telecommunication network such as a public switched telephone network (PSTN), and/or the Internet, among various possibilities). Thus, the base station 102 may facilitate communication among the various devices and the cellular network. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the cellular network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to cellular-equipped devices (such as UEs, UAVs, and UAV controllers) over a geographic area via one or more cellular communication standards.

Figure 10:
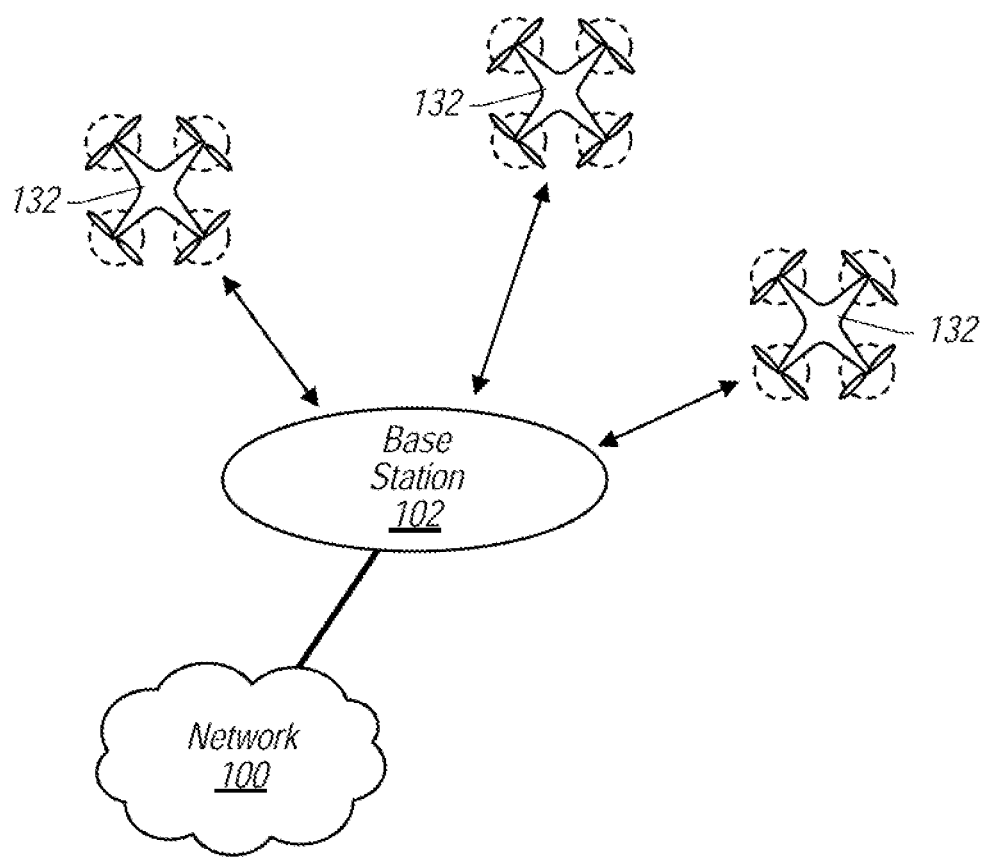
FIG. 10 illustrates a base station in communication with a UAV, according to some embodiments.

The box labeled "UTM" refers to UAS Traffic Management, which may be implemented by a computer system, e.g., a server, or in "the cloud" outside of (e.g., "behind") the cellular network. Thus, a server may implement UTM (UAS Traffic Management) functionality (which may be a combination of hardware and software) for coordinating operation and data traffic between one or more of the UAVs and one or more of the UAV controllers. Thus, a server or other device implementing UTM functionality is shown in FIG. 10 as "UTM" for convenience. It is noted that each cellular network provider may implement its own UTM.

The unmanned aerial system (UAS) shown in FIG. 9 may at least partially operate according to the UAS reference model in 3GPP. In the 3GPP UAS reference model, a subset or all of the following may exist: 1) the UAS is composed of at least one UAV controller and one or more UAVs; 2) at least a subset of the UAVs are connected over cellular connectivity; 3) a UAV may be controlled by a UAV controller connected via a cellular network, such as the 3GPP mobile network; 4) a UAV may be controlled by a UAV controller not connected via the cellular network, e.g., using a non-cellular C2 interface; 5) a UAV controller connected via the cellular network (e.g., 3GPP mobile network) may control one or more UAV(s); and 6) the UAS may exchange application data traffic with a UTM.

FIG. 10 illustrates an example unmanned aerial equipment (UAV), e.g., UAV 132 in communication with the base station 102, according to some embodiments. The UAV 132 may be a device with wireless network connectivity such as cellular network connectivity, such as may be found in a UE, such as UE 106. The UAV 132 may include a processor (processing element) that is configured to execute program instructions stored in memory. The UAV 132 may perform any of the method embodiments described herein by executing such stored instructions. Alternatively, or in addition, the UAV 132 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UAV 132 may be configured to communicate using any of multiple wireless communication protocols. For example, the UAV 132 may be configured to communicate using two or more of CDMA2000, LTE, LTE-A, 5G NR, WLAN, or GNSS. Other combinations of wireless communication standards are also possible.

The UAV 132 may include a radio and one or more antennas for communicating using one or more wireless communication protocols according to one or more RAT standards. In some embodiments, the UAV 132 may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Figure 11:
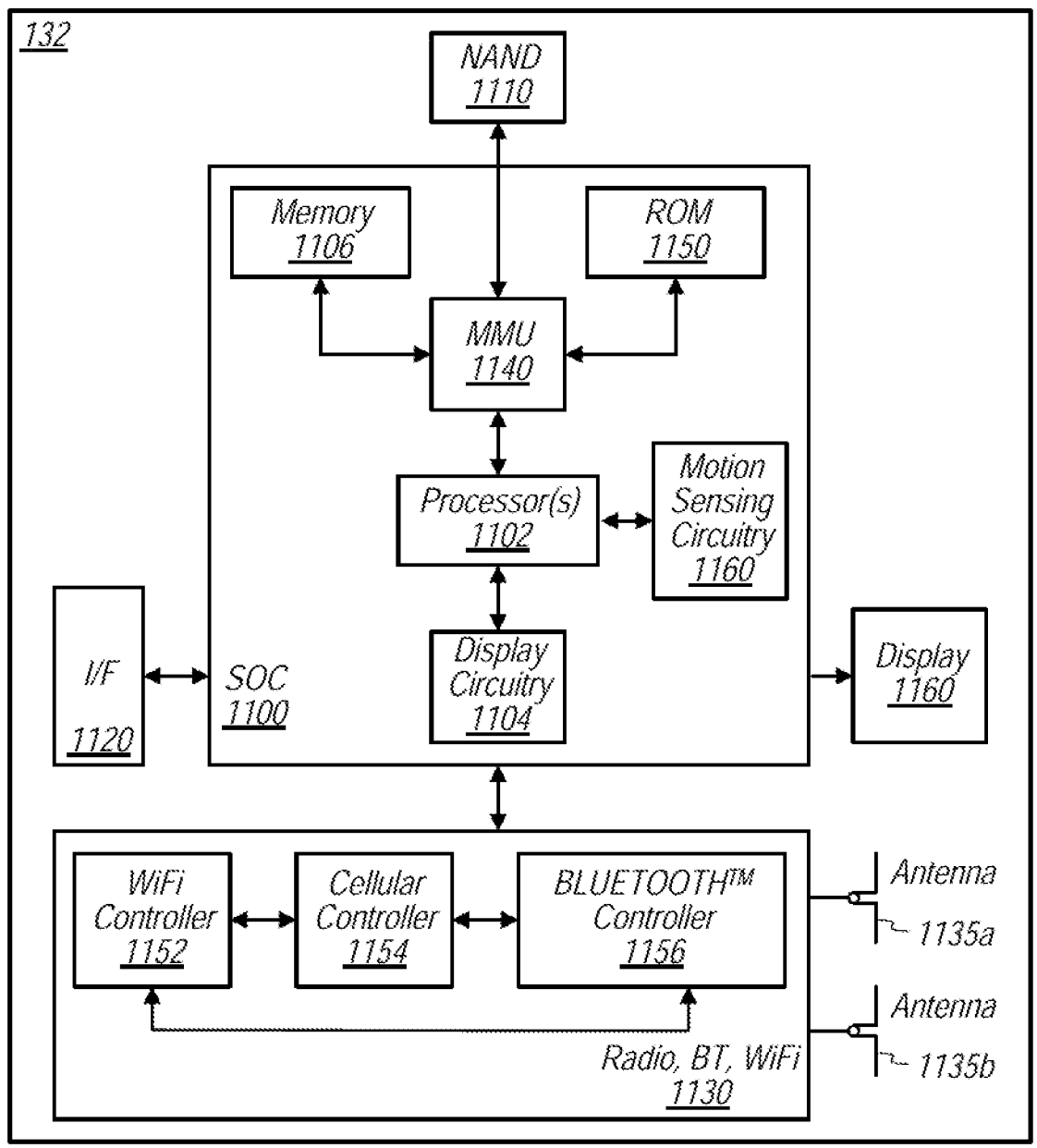
FIG. 11 illustrates an example block diagram of a UAV, according to some embodiments.

FIG. 11—Block Diagram of an Example UAV

FIG. 11 illustrates a block diagram of an exemplary UAV, such as the UAV 132, according to some embodiments. As shown, the UAV may include a processor or system on chip (SOC) 1100, which may include portions for various purposes. For example, as shown, the SOC 1100 may include processor(s) 1102 which may execute program instructions for the UAV. The processor(s) 1102 may be coupled to memory management unit (MMU) 1140, which may be configured to receive addresses from the processor(s) 1102 and translate those addresses to locations in memory (e.g., memory 1106, read only memory (ROM) 1150, NAND flash memory 1110) and/or to other circuits or devices, such as radio 1130, connector interface (I/F) 1120, various sensors such as video camera, etc. In some embodiments, the MMU 1140 may be included as a portion of the processor(s) 1102.

As shown, the SOC 1100 may be coupled to various other circuits of the UAV 132. For example, the UAV 132 may include various types of memory (e.g., including Flash 1110), a connector interface 1120 (e.g., for coupling to a charging station, etc., and wireless communication circuitry 1130 (e.g., for LTE, LTE-A, NR, CDMA2000, BLUETOOTH™, Wi-Fi, GPS, etc.). The UAV may include at least one antenna (e.g. 1135a), and possibly multiple antennas (e.g. illustrated by antennas 1135a and 1135b), for performing wireless communication with base stations, controllers, and/or other devices. Antennas 1135a and 1135b are shown by way of example, and UAV 132 may include fewer or more antennas. Overall, the one or more antennas are collectively referred to as antenna 1135. For example, the UAV may use antenna 1135 to perform the wireless communication with the aid of radio circuitry 1130. As noted above, the UAV may be configured to communicate wirelessly using multiple wireless communication standards in some embodiments.

The UAV may include hardware and software components for implementing methods as described herein. The processor(s) 1102 of the UAV 132 may be configured to implement part or all of the methods described herein, e.g., by executing program instructions stored on a memory medium (e.g., a non-transitory computer-readable memory medium). In other embodiments, processor(s) 1102 may be configured as a programmable hardware element, such as an FPGA (Field Programmable Gate Array), or as an ASIC (Application Specific Integrated Circuit). Furthermore, processor(s) 1102 may be coupled to and/or may interoperate with other components as shown in FIG. 11, to perform the various embodiments disclosed herein. Processor(s) 1102 may also implement various other applications and/or end-user applications running on UAV.

In some embodiments, radio 1130 may include separate controllers dedicated to controlling communications for various respective RAT standards. For example, as shown in FIG. 11, radio 1130 may include a Wi-Fi controller 1152, a cellular controller (e.g. LTE and/or LTE-A controller) 1154, and BLUETOOTH™ controller 1156, and in at least some embodiments, one or more or all of these controllers may be implemented as respective integrated circuits (ICs or chips, for short) in communication with each other and with SOC 1100 (and more specifically with processor(s) 1102). While three separate controllers are illustrated within radio 1130, other embodiments have fewer or more similar controllers for various different RATs that may be implemented in UAV.

Figure 12:
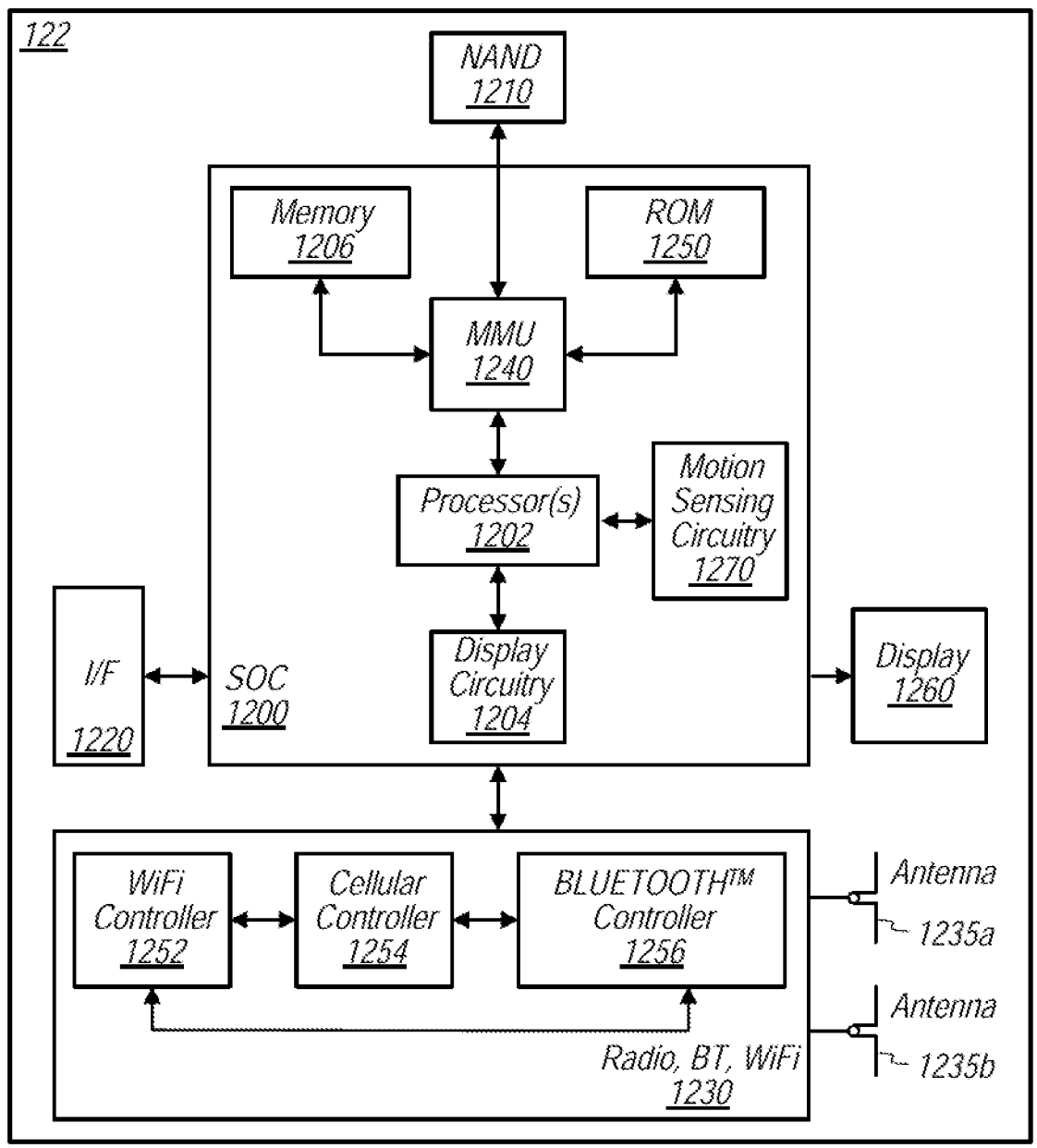
FIG. 12 illustrates an example block diagram of a UAC, according to some embodiments.

FIG. 12—Block Diagram of an Example UAC

FIG. 12 illustrates a block diagram of an exemplary UAC, such as the UAC 122, according to some embodiments. As shown, the UAC may include a processor or system on chip (SOC) 1200, which may include portions for various purposes. For example, as shown, the SOC 1200 may include processor(s) 1202 which may execute program instructions for the UAC. The processor(s) 1202 may be coupled to memory management unit (MMU) 1240, which may be configured to receive addresses from the processor(s) 1202 and translate those addresses to locations in memory (e.g., memory 1206, read only memory (ROM) 1250, NAND flash memory 1210) and/or to other circuits or devices, such as radio 1230, connector interface (I/F) 1220, various sensors such as video camera, etc. In some embodiments, the MMU 1240 may be included as a portion of the processor(s) 1202.

As shown, the SOC 1200 may be coupled to various other circuits of the UAC 122. For example, the UAC 122 may include various types of memory (e.g., including Flash 1210), a connector interface 1220 (e.g., for coupling to a charging station, etc., and wireless communication circuitry 1230 (e.g., for LTE, LTE-A, NR, CDMA2000, BLUETOOTH™, Wi-Fi, GPS, etc.). The UAC may include at least one antenna (e.g. 1235a), and possibly multiple antennas (e.g. illustrated by antennas 1235a and 1235b), for performing wireless communication with base stations, controllers, and/or other devices. Antennas 1235a and 1235b are shown by way of example, and UAC 122 may include fewer or more antennas. Overall, the one or more antennas are collectively referred to as antenna 1235. For example, the UAC may use antenna 1235 to perform the wireless communication with the aid of radio circuitry 1230. As noted above, the UAC may be configured to communicate wirelessly using multiple wireless communication standards in some embodiments.

The UAC may include hardware and software components for implementing methods as described herein. The processor(s) 1202 of the UAC 122 may be configured to implement part or all of the methods described herein, e.g., by executing program instructions stored on a memory medium (e.g., a non-transitory computer-readable memory medium). In other embodiments, processor(s) 1202 may be configured as a programmable hardware element, such as an FPGA (Field Programmable Gate Array), or as an ASIC (Application Specific Integrated Circuit). Furthermore, processor(s) 1202 may be coupled to and/or may interoperate with other components as shown in FIG. 12, to perform the various embodiments disclosed herein. Processor(s) 1202 may also implement various other applications and/or end-user applications running on UAC.

In some embodiments, radio 1230 may include separate controllers dedicated to controlling communications for various respective RAT standards. For example, as shown in FIG. 12, radio 1230 may include a Wi-Fi controller 1252, a cellular controller (e.g. LTE and/or LTE-A controller) 1254, and BLUETOOTH™ controller 1256, and in at least some embodiments, one or more or all of these controllers may be implemented as respective integrated circuits (ICs or chips, for short) in communication with each other and with SOC 1200 (and more specifically with processor(s) 1202). While three separate controllers are illustrated within radio 1230, other embodiments have fewer or more similar controllers for various different RATs that may be implemented in UAC.

Tracking UAV and UAC

Embodiments described herein provide systems, methods, and mechanisms for a network (e.g., such as a 3GPP system) to track an unmanned aerial vehicle, such as UAV 132, and UAV control, such as UAC 122. In some embodiments, a UAV and/or UAC may provide a network with information such that the network can track the UAV/UAC as well as make operation decisions based on the information, e.g., to ensure the UAV/UAC is under control in some scenarios. In some embodiments, a network may initiate a change in a C2 communication mode based on received tracking information. In some embodiments, a UE (e.g., such as a UAV/UAC) may initiate a communication mode change based on tracking information.

For example, a UAV and corresponding UAC may be authorized and registered to (or with) a Fifth Generation New Radio (5G NR) core network (5GC). Additionally, the UAV and corresponding UAC may be considered (or categorized) by the 5GC as an unmanned aerial system (UAS) with a C2 communication mode of "Network-Assisted." In other words, the UAV and corresponding UAC may be operating in "Network-Assisted mode" as described above. In some embodiments, the C2 communication mode may need to be transferred (or switched) between "Network-Assisted mode" and "UTM-Navigated mode." In some embodiments, such a transfer may be based, at least in part, on various tracking information provided by the UAV/UAC to the UTM via the 5GC. For example, in some embodiments, the tracking information may include periodical reports. The periodical reports may include navigational properties of the UAV such as (any, any combination of, and/or all of) UAV speed (speed), UAV orientation (orientation), UAV altitude (altitude). Additionally, the periodical reports may include (any, any combination of, and/or all of) C2 communication quality, cell identifier (cell ID), tracking area code identifier (TAC ID), a measurement report, radio resource control status (RRC status), UAV current location (current location), UAV destination location (destination location), and so forth, among other information. As another example, in some embodiments, the tracking information may include an event report. The event report may include a C2 communication mode change request, a cause for the request, and/or various other information such as (any, any combination of, and/or all of) C2 communication quality, cell identifier (cell ID), tracking area code identifier (TAC ID), a measurement report, radio resource control status (RRC status), UAV current location (current location), UAV destination location (destination location), and so forth. For example, in some embodiments, the cause may include information indicating UAC control release (e.g., due to UAC low power), UAC control suspend (e.g., due to UAV entering designated area), UAC control resume (e.g., due to UAV leaving designated area), and/or corresponding (or associated) UAC lost (e.g., UAV not receiving C2 commands from UAC). In some embodiments, a designated area may require (or include) a fixed (or specified) route due to various reasons, including, but not limited to, government policy, air traffic control, public safety guidelines, and so forth.

Figure 13:
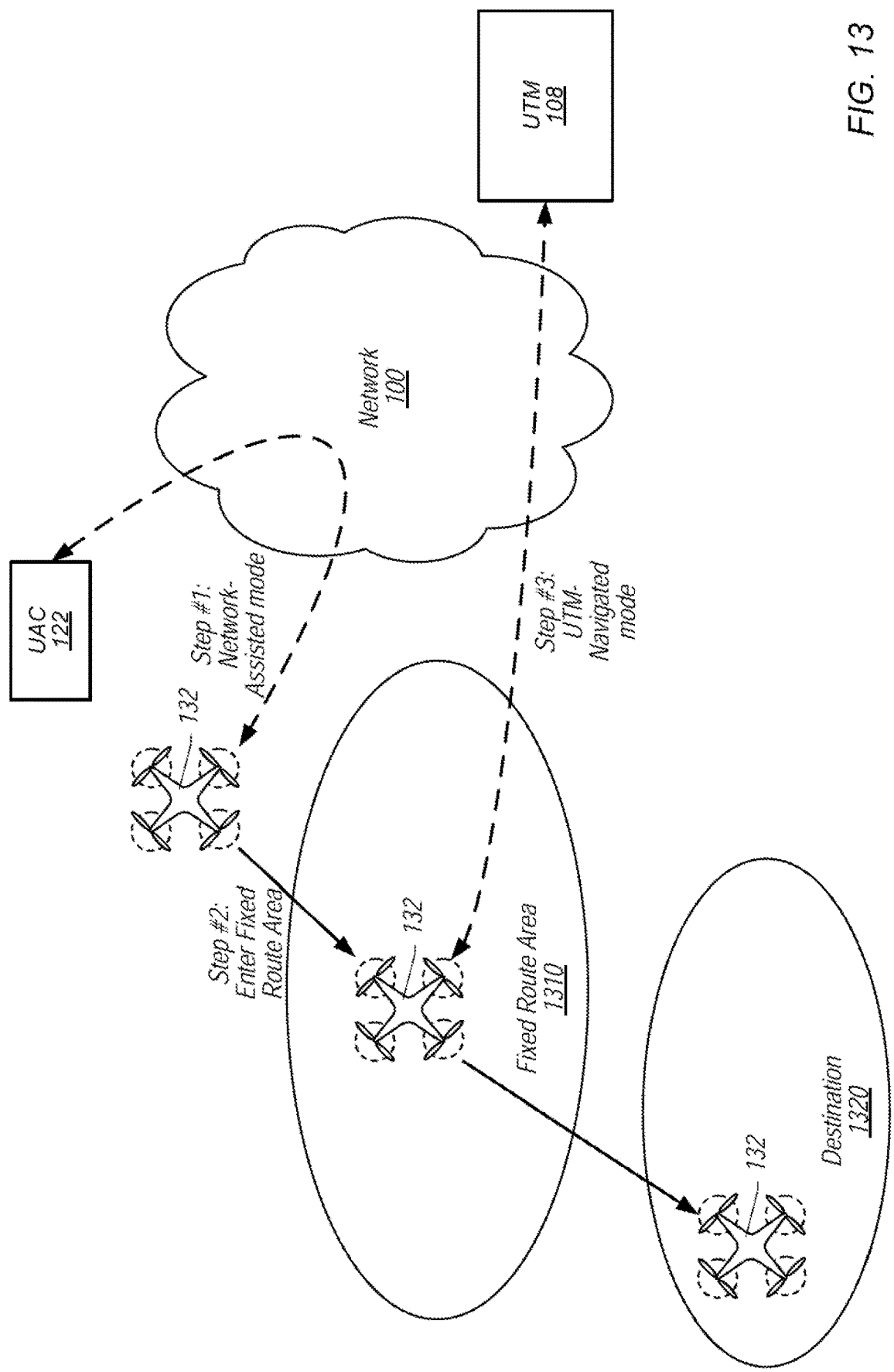
FIG. 13 illustrates an example of a mode change based on UAV location, according to some embodiments.

FIG. 13 illustrates an example of a mode change based on UAV location, according to some embodiments. As shown, UAC 122 may control UAV 132 via C2 communications through network 100, e.g., as designated by Step #1: Network-Assisted mode. As the UAV 132 travels (moves) into fixed route area 1310 (e.g., a designated area), e.g., as designated by Step #2: Enter fixed route area, navigation control may be transferred to UTM 108. UTM 108 may then control UAV 132 through fixed route area 1310, e.g., as designated by Step #3: UTM-Navigated mode. Once UAV 132 exits the fixed route area 1310, navigation control may remain with UTM 108 or may be transferred back to UAC 122 to navigate UAV 132 to destination 1320.

Figure 14:
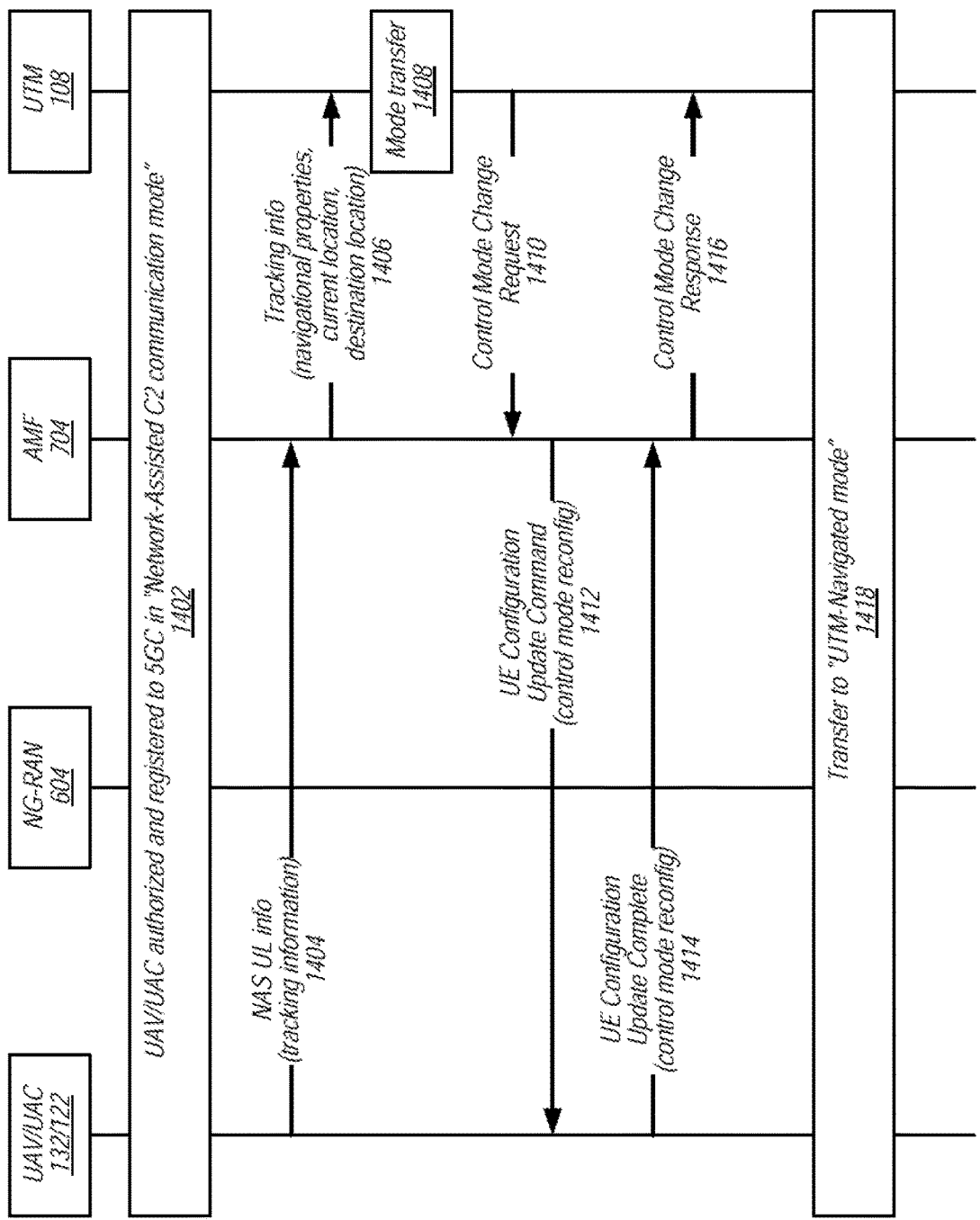
FIG. 14 illustrates a block diagram of an example of a signaling for a mode change based on UAV location, according to some embodiments.

FIG. 14 illustrates a block diagram of an example of a signaling for a mode change based on UAV location, according to some embodiments. The signaling shown in FIG. 14 may be used in conjunction with any of the systems, methods, or devices shown in the Figures, among other devices. In various embodiments, some of the signaling shown may be performed concurrently, in a different order than shown, or may be omitted. Additional signaling elements may also be performed as desired. As shown, this signaling may operate as follows.

At 1402, the UAV 132/UAC 122 (UAV/UAC) may perform a procedure with UTM 108 (e.g., via NG-RAN (base station 604) and AMF 704) to be authorized and registered to a 5G network core (5GC) in a Network-Assisted C2 communication mode.

At 1404, the UAV/UAC may provide AMF 704 with network access stratum uplink (NAS UL) information, including tracking information. In some embodiments, the tracking information may be periodic tracking information and may include UAV navigational properties such as UAV speed, orientation, altitude, cell ID, and TAC ID. The tracking information may also include global positioning information associated with the UAV, such as UAV current location and/or UAV destination location. In some embodiments, the tracking information may include identifiers for the UAC and/or UAV, e.g., UAC/UAV IDs.

At 1406, the AMF 704 (AMF) may forward the tracking information to UTM 108 (UTM). The tracking information may include UAV navigational properties such as UAV speed, orientation, altitude, cell ID, and TAC ID. The tracking information may also include global positioning information associated with the UAV, such as UAV current location and/or UAV destination location.

At 1408, the UTM may determine, based at least in part on the tracking information, to change control from the UAC to the UTM, e.g., transfer (or switch) the UAV from the Network-Assisted C2 communication mode to a UTM-Navigated mode. In some embodiments, the UTM may determine a cause for the transfer. For example, in some embodiments, a cause may be the UAV's entrance into a designated (e.g., restricted) area. In some embodiments, a cause may be the UAV's flight plan that includes a designated (e.g., restricted) area. In some embodiments, a designated (e.g., restricted) area may include areas (or zones) designated by air traffic control and/or public safety agencies. Such areas may include particular altitude requirements/restrictions, as well as flight path requirements/restrictions, and/or UAV velocity requirements/restrictions. In some embodiments, the mode change may be triggered (e.g., occur) when (or as) the UAV enters the designated area.

At 1410, the UTM may send the AMF a control mode change request. The request may include the UAC ID, the UAV ID, and/or both IDs. In some embodiments, the request may include a cause (or cause code) for the mode change. In some embodiments, the request may be triggered (e.g., occur) when (or as) the UAV enters the designated area.

At 1412, the AMF may send a UE configuration update command message to the UAC/UAV. In some embodiments, the UE configuration update command message may include a control mode reconfiguration as well as the UAC ID, the UAV ID, and/or both IDs. In some embodiments, a cause (or cause code) for the mode change may be included in the UE configuration update command message.

At 1414, the UAV/UAC may send a UE configuration update complete message to the AMF. The UE configuration update complete message may include an indication that the control mode reconfiguration is complete as well as the UAC ID, the UAV ID, and/or both IDs.

At 1416, the AMF may send a control mode change response to the UTM. The control mode change response may include the UAC ID, the UAV ID, and/or both IDs. In some embodiments, the response may include a cause (or cause code) for the mode change.

At 1418, control of the UAV may be transferred from the UAC to the UTM. In other words, navigational control of the UAV may be transferred from the UAC to the UTM, e.g., the UTM may navigate the UAV through the designated area. In some embodiments, the navigation of the UAV through the designated area may be based on government policy, air traffic control policies/guidelines, and/or public safety guidelines, among other policies and/or guidelines.

Figure 15:
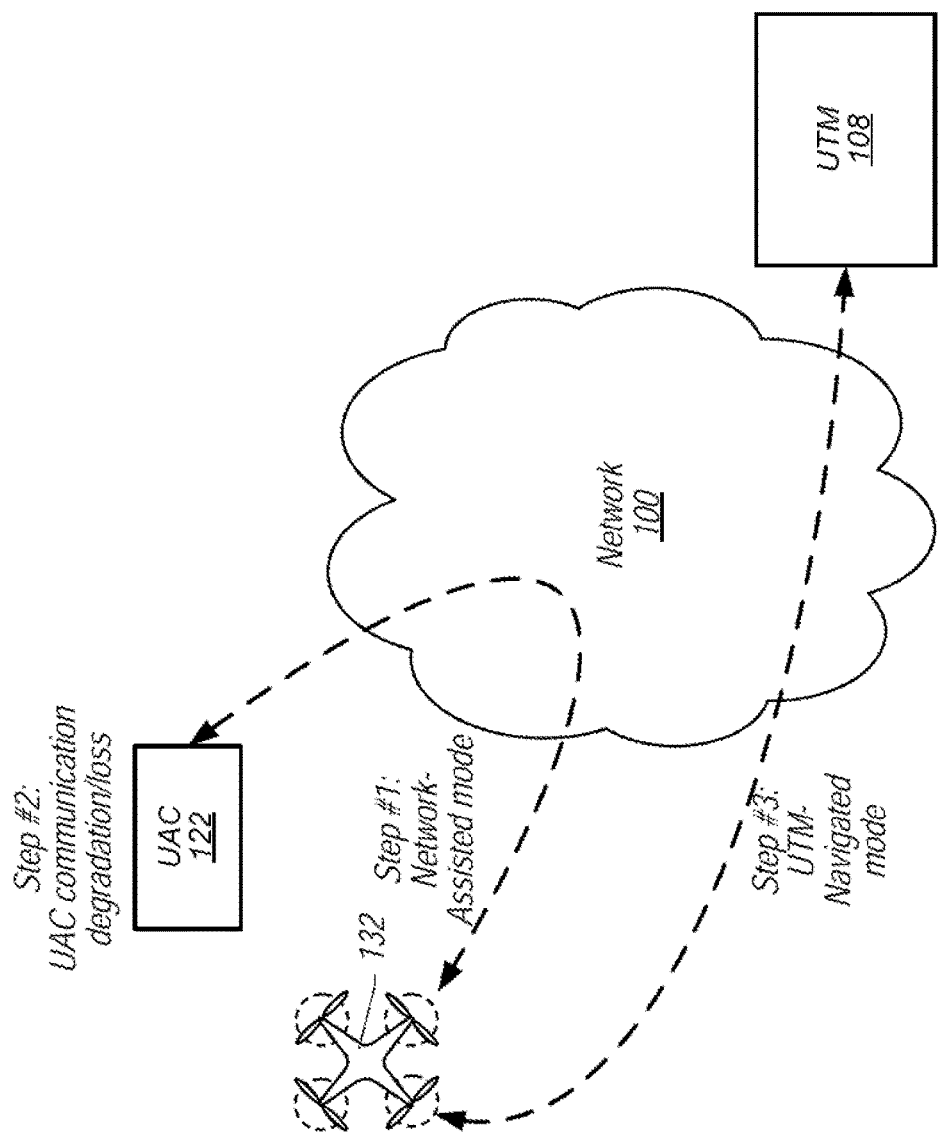
FIG. 15 illustrates an example of a mode change based on UAV/UAC C2 communication conditions, according to some embodiments.

FIG. 15 illustrates an example of a mode change based on UAV/UAC C2 communication conditions, according to some embodiments. As shown, UAC 122 may control UAV 132 via C2 communications through network 100, e.g., as designated by Step #1: Network-Assisted mode. As the UAV 132 travels (moves), the UAC may experience communication degradation and/or loss (e.g., the UAC may experience a service loss, degrading radio frequency conditions, and/or degrading C2 communication quality) such that C2 communications with the UAV 132 become compromised (e.g., C2 communication quality drops below a threshold for safe control of the UAV), e.g., as designated by Step #2: UAC communication degradation/loss. In other words, communication between UAC 122 and UAV 132 may deteriorate below a threshold for reliable navigation of UAV 132 by UAC 122. UTM 108 may notice (detect) UAC 122's radio conditions and may determine to transfer navigation control to UTM 108. UTM 108 may then control UAV 132 at least until radio conditions of UAC 122 improve above the threshold for reliable navigation, e.g., as designated by Step #3: UTM-Navigated mode.

Figure 16:
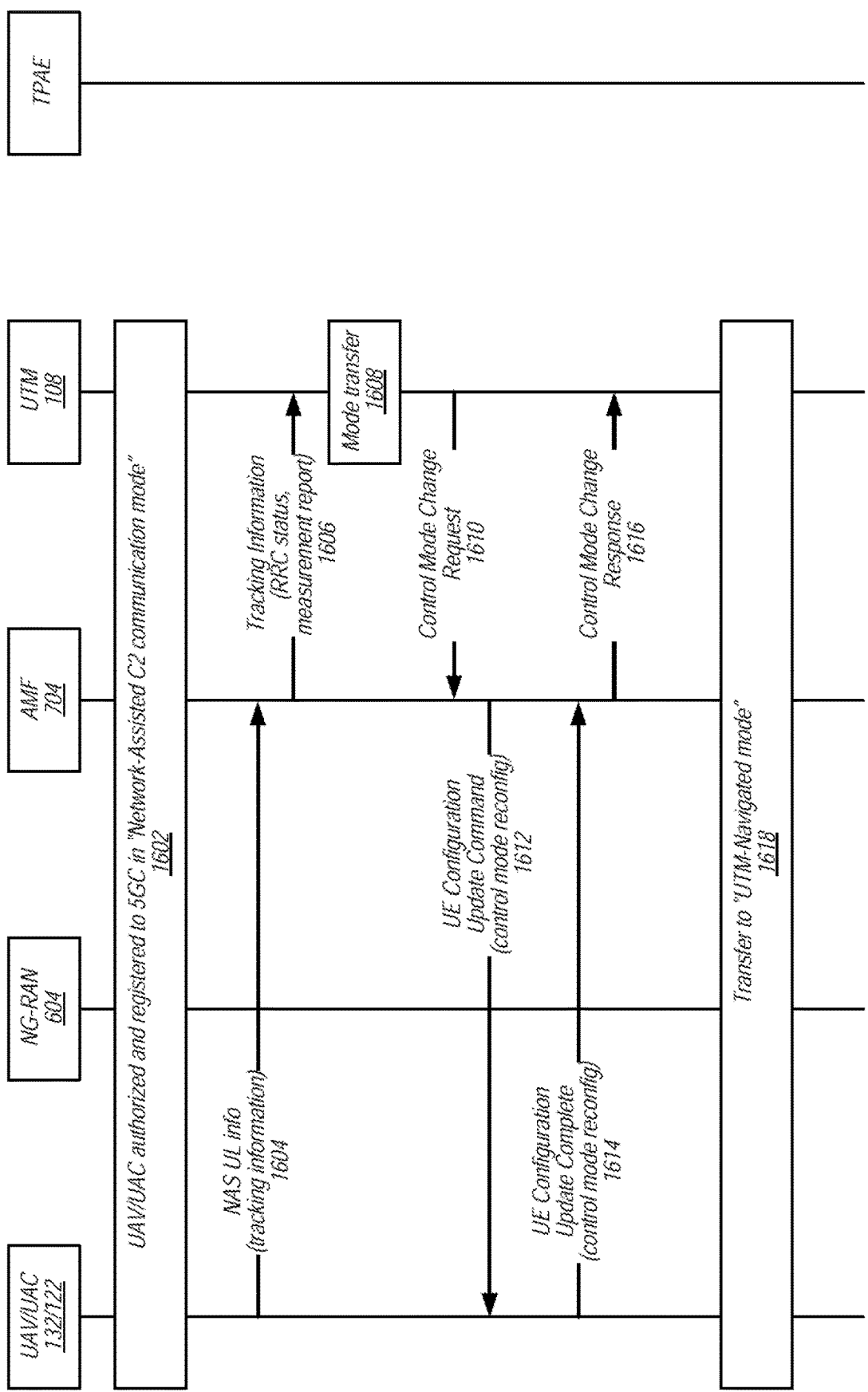
FIG. 16 illustrates a block diagram of an example of a signaling for a mode change based on UAC radio conditions, according to some embodiments.

FIG. 16 illustrates a block diagram of an example of a signaling for a mode change based on UAC radio conditions, according to some embodiments. The signaling shown in FIG. 16 may be used in conjunction with any of the systems, methods, or devices shown in the Figures, among other devices. In various embodiments, some of the signaling shown may be performed concurrently, in a different order than shown, or may be omitted. Additional signaling elements may also be performed as desired. As shown, this signaling may operate as follows.

At 1602, the UAV 132/UAC 122 (UAV/UAC) may perform a procedure with UTM 108 (e.g., via NG-RAN (base station 604) and AMF 704) to be authorized and registered to a 5G network core (5GC) in a Network-Assisted C2 communication mode.

At 1604, the UAV/UAC may provide AMF 704 with network access stratum uplink (NAS UL) information, including tracking information. In some embodiments, the tracking information may be periodic tracking information and may include identifiers for the UAC and/or UAV, e.g., UAC/UAV IDs. In addition, the tracking information may include C2 communication quality, a (RF) measurement report, cell ID, TAC ID, and/or RRC status of the UAC and/or UAV.

At 1606, the AMF 704 (AMF) may forward the tracking information to UTM 108 (UTM). The tracking information may include identifiers for the UAC and/or UAV, e.g., UAC/UAV IDs. In addition, the tracking information may include C2 communication quality, a (RF) measurement report, cell ID, TAC ID, and/or RRC status of the UAC and/or UAV.

At 1608, the UTM may determine, based at least in part on the tracking information, to change control from the UAC to the UTM, e.g., transfer (or switch) the UAV from the Network-Assisted C2 communication mode to a UTM-Navigated mode. In some embodiments, the UTM may determine a cause for the transfer. For example, in some embodiments, a cause may be that the UAC is in a no service condition. In some embodiments, a cause may be that a C2 communication link quality between the UAC and UAV is below a threshold for reliable navigation.

At 1610, the UTM may send the AMF a control mode change request. The request may include the UAC ID, the UAV ID, and/or both IDs. In some embodiments, the request may include a cause (or cause code) for the mode change. In some embodiments, the request may be triggered (e.g., occur) based on the radio conditions of the UAC/UAV.

At 1612, the AMF may send a UE configuration update command message to the UAC/UAV. In some embodiments, the UE configuration update command message may include a control mode reconfiguration as well as the UAC ID, the UAV ID, and/or both IDs. In some embodiments, a cause (or cause code) for the mode change may be included in the UE configuration update command message.

At 1614, the UAV/UAC may send a UE configuration update complete message to the AMF. The UE configuration update complete message may include an indication that the control mode reconfiguration is complete as well as the UAC ID, the UAV ID, and/or both IDs.

At 1616, the AMF may send a control mode change response to the UTM. The control mode change response may include the UAC ID, the UAV ID, and/or both IDs. In some embodiments, the response may include a cause (or cause code) for the mode change.

At 1618, control of the UAV may be transferred from the UAC to the UTM. In other words, navigational control of the UAV may be transferred from the UAC to the UTM, e.g., the UTM may navigate the UAV at least until C2 communication link quality between the UAC and UAV improves above the threshold for reliable navigation.

Figure 17:
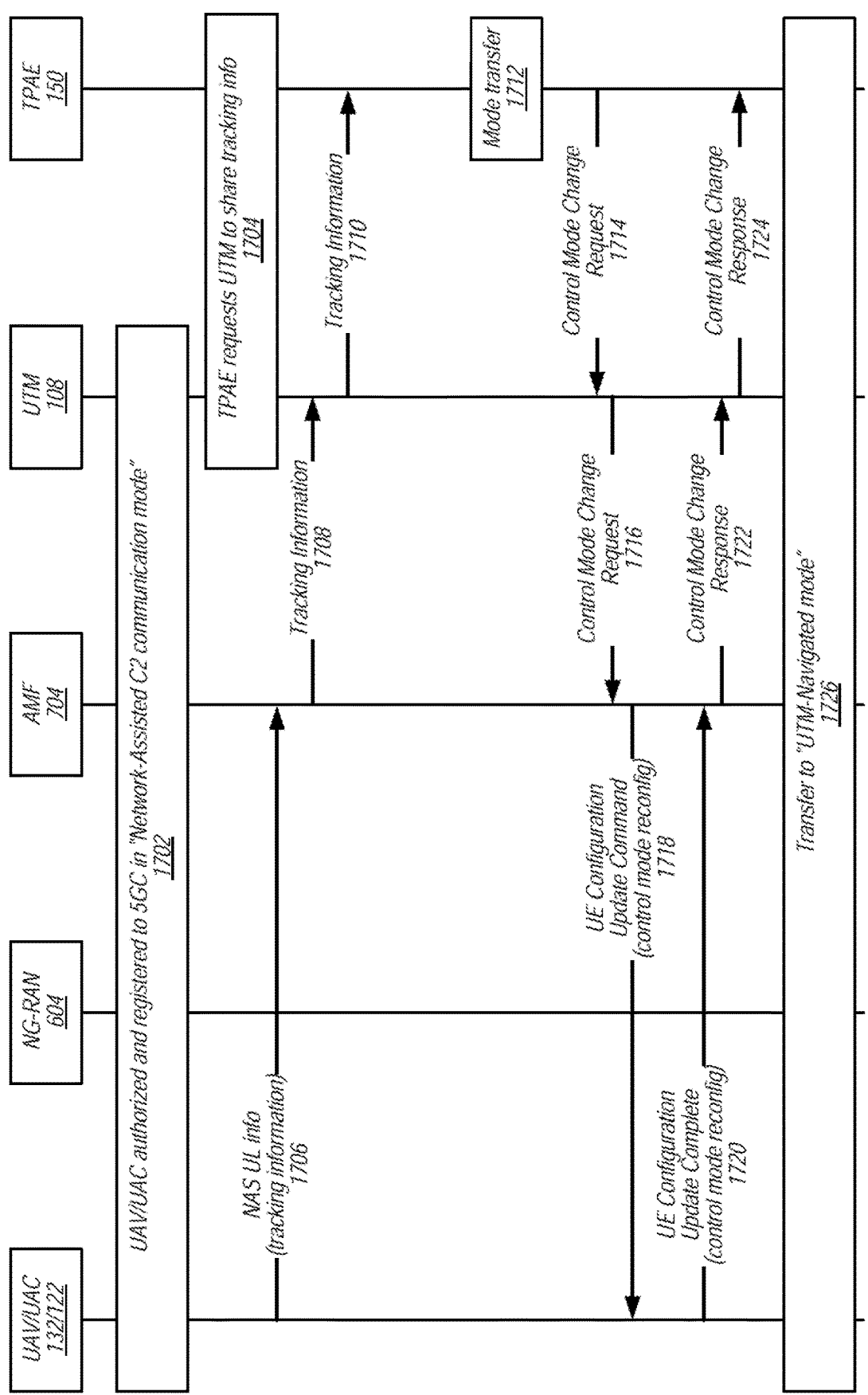
FIG. 17 illustrates a block diagram of another example of a signaling for a mode change based on UAV location, according to some embodiments.

FIG. 17 illustrates a block diagram of another example of a signaling for a mode change based on UAV location, according to some embodiments. The signaling shown in FIG. 17 may be used in conjunction with any of the systems, methods, or devices shown in the Figures, among other devices. In various embodiments, some of the signaling shown may be performed concurrently, in a different order than shown, or may be omitted. Additional signaling elements may also be performed as desired. As shown, this signaling may operate as follows.

At 1702, the UAV 132/UAC 122 (UAV/UAC) may perform a procedure with UTM 108 (e.g., via NG-RAN (base station 604) and AMF 704) to be authorized and registered to a 5G network core (5GC) in a Network-Assisted C2 communication mode.

At 1704, Third Party Authorized Entity (TPAE) 150 (e.g., a government controlled/defined function for monitoring UAV activities within the government's territories/airspace) may request UTM 108 to share tracking information of the UAV/UAC. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM.

At 1706, the UAV/UAC may provide AMF 704 with network access stratum uplink (NAS UL) information, including tracking information. In some embodiments, the tracking information may be periodic tracking information and may include UAV navigational properties such as UAV speed, orientation, altitude, cell ID, and TAC ID. The tracking information may also include global positioning information associated with the UAV, such as UAV current location and/or UAV destination location. In some embodiments, the tracking information may include identifiers for the UAC and/or UAV, e.g., UAC/UAV IDs. In addition, in some embodiments, the tracking information may include C2 communication quality, a (RF) measurement report, and/or RRC status of the UAC and/or UAV.

At 1708, the AMF 704 (AMF) may forward the tracking information to UTM 108 (UTM). The tracking information may include UAV navigational properties such as UAV speed, orientation, altitude, cell ID, and TAC ID. The tracking information may also include global positioning information associated with the UAV, such as UAV current location and/or UAV destination location. Further, in some embodiments, the tracking information may include C2 communication quality, a (RF) measurement report, and/or RRC status of the UAC and/or UAV.

At 1710, the UTM may forward the tracking information to TPAE 150 (TPAE). The tracking information may include UAV navigational properties such as UAV speed, orientation, altitude, cell ID, and TAC ID. The tracking information may also include global positioning information associated with the UAV, such as UAV current location and/or UAV destination location. Further, in some embodiments, the tracking information may include C2 communication quality, a (RF) measurement report, and/or RRC status of the UAC and/or UAV.

At 1712, the TPAE may determine, based at least in part on the tracking information, to change control from the UAC to the UTM, e.g., transfer (or switch) the UAV from the Network-Assisted C2 communication mode to a UTM-Navigated mode. In some embodiments, the TPAE may determine a cause for the transfer. For example, in some embodiments, a cause may be based on government air traffic flow control.

At 1714, the TPAE may send the UTM a control mode change request. The request may include the UAC ID, the UAV ID, and/or both IDs. In some embodiments, the request may include a cause (or cause code) for the mode change. In some embodiments, the request may be triggered (e.g., occur) based on government air traffic flow control policy.

At 1716, the UTM may send the AMF a control mode change request. The request may include the UAC ID, the UAV ID, and/or both IDs. In some embodiments, the request may include a cause (or cause code) for the mode change.

At 1718, the AMF may send a UE configuration update command message to the UAC/UAV. In some embodiments, the UE configuration update command message may include a control mode reconfiguration as well as the UAC ID, the UAV ID, and/or both IDs. In some embodiments, a cause (or cause code) for the mode change may be included in the UE configuration update command message.

At 1720, the UAV/UAC may send a UE configuration update complete message to the AMF. The UE configuration update complete message may include an indication that the control mode reconfiguration is complete as well as the UAC ID, the UAV ID, and/or both IDs.

At 1722, the AMF may send a control mode change response to the UTM. The control mode change response may include the UAC ID, the UAV ID, and/or both IDs. In some embodiments, the response may include a cause (or cause code) for the mode change.

At 1724, control of the UAV may be transferred from the UAC to the UTM. In other words, navigational control of the UAV may be transferred from the UAC to the UTM, e.g., the UTM may navigate the UAV based on government air traffic control policy.

Figure 18:
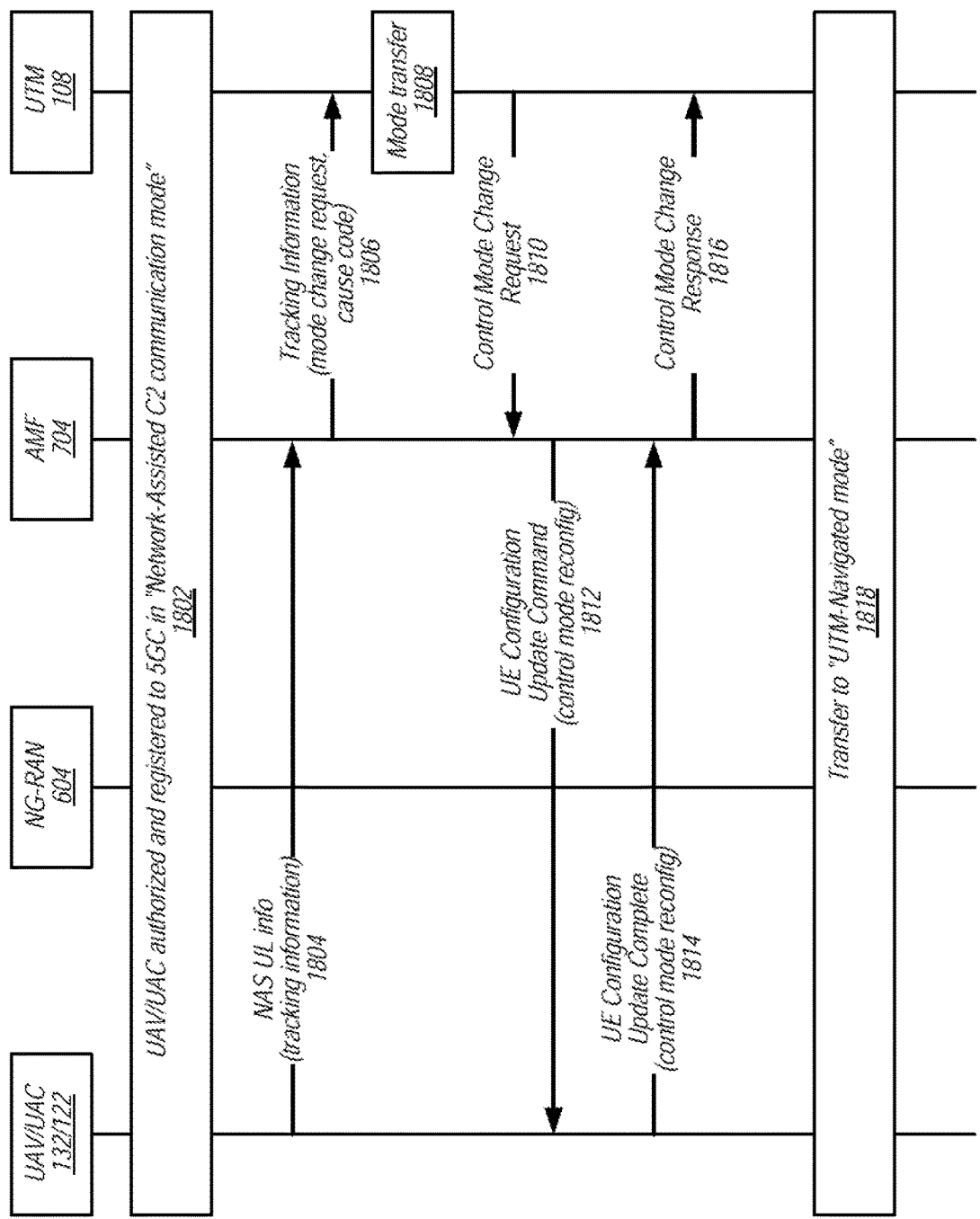
FIG. 18 illustrates a block diagram of an example of a signaling for a mode change initiated by a UAC/UAV, according to some embodiments.

FIG. 18 illustrates a block diagram of an example of a signaling for a mode change initiated by a UAC/UAV, according to some embodiments. The signaling shown in FIG. 18 may be used in conjunction with any of the systems, methods, or devices shown in the Figures, among other devices. In various embodiments, some of the signaling shown may be performed concurrently, in a different order than shown, or may be omitted. Additional signaling elements may also be performed as desired. As shown, this signaling may operate as follows.

At 1802, the UAV 132/UAC 122 (UAV/UAC) may perform a procedure with UTM 108 (e.g., via NG-RAN (base station 604) and AMF 704) to be authorized and registered to a 5G network core (5GC) in a Network-Assisted C2 communication mode.

At 1804, the UAV/UAC may provide AMF 704 with network access stratum uplink (NAS UL) information, including tracking information. In some embodiments, the tracking information may be event-based tracking information and may include identifiers for the UAC and/or UAV, e.g., UAC/UAV IDs. In addition, the tracking information may include C2 communication mode change request. In some embodiments, the tracking information may include a cause code. In some embodiments, the cause code may include a UAC-initiated mode change, such as UAC control release, UAC control suspend, and/or UAC control resume, and/or a UAV-initiated mode change, such as associated UAC lost. In some embodiments, the UAV-initiated mode change may be based, at least in part, on the UAV's failure to receive commands over a C2 communication link to the UAC. In some embodiments, a UAC control release cause code may be based on, at least in part, on the UAC's power level dropping below a threshold for reliable navigation of the UAV. In some embodiments, a UAC control suspend cause code may be based, at least in part, on the UAC determining the UAV is entering (or imminently entering) a restricted/designated area. In some embodiments, a UAC control resume cause code may be based, at least in part, on the UAC determining the UAV is leaving (or imminently leaving) a restricted/designated area.

At 1806, the AMF 704 (AMF) may forward the tracking information to UTM 108 (UTM). The tracking information may include identifiers for the UAC and/or UAV, e.g., UAC/UAV IDs. In addition, the tracking information may include the C2 communication mode change request and/or the cause code.

At 1808, the UTM may determine, based at least in part on the tracking information, to change control from the UAC to the UTM, e.g., transfer (or switch) the UAV from the Network-Assisted C2 communication mode to a UTM-Navigated mode. In some embodiments, the UTM may base the transfer on the C2 communication mode change request and/or the cause code.

At 1810, the UTM may send the AMF a control mode change request. The request may include the UAC ID, the UAV ID, and/or both IDs. In some embodiments, the request may include a cause (or cause code) for the mode change. In some embodiments, the request may be triggered (e.g., occur) based on the radio conditions of the UAC/UAV.

At 1812, the AMF may send a UE configuration update command message to the UAC/UAV. In some embodiments, the UE configuration update command message may include a control mode reconfiguration as well as the UAC ID, the UAV ID, and/or both IDs. In some embodiments, the cause code for the mode change may be included in the UE configuration update command message.

At 1814, the UAV/UAC may send a UE configuration update complete message to the AMF. The UE configuration update complete message may include an indication that the control mode reconfiguration is complete as well as the UAC ID, the UAV ID, and/or both IDs.

At 1816, the AMF may send a control mode change response to the UTM. The control mode change response may include the UAC ID, the UAV ID, and/or both IDs. In some embodiments, the response may include the cause code for the mode change.

At 1818, control of the UAV may be transferred from the UAC to the UTM. In other words, navigational control of the UAV may be transferred from the UAC to the UTM, e.g., the UTM may navigate the UAV.

Figure 19:
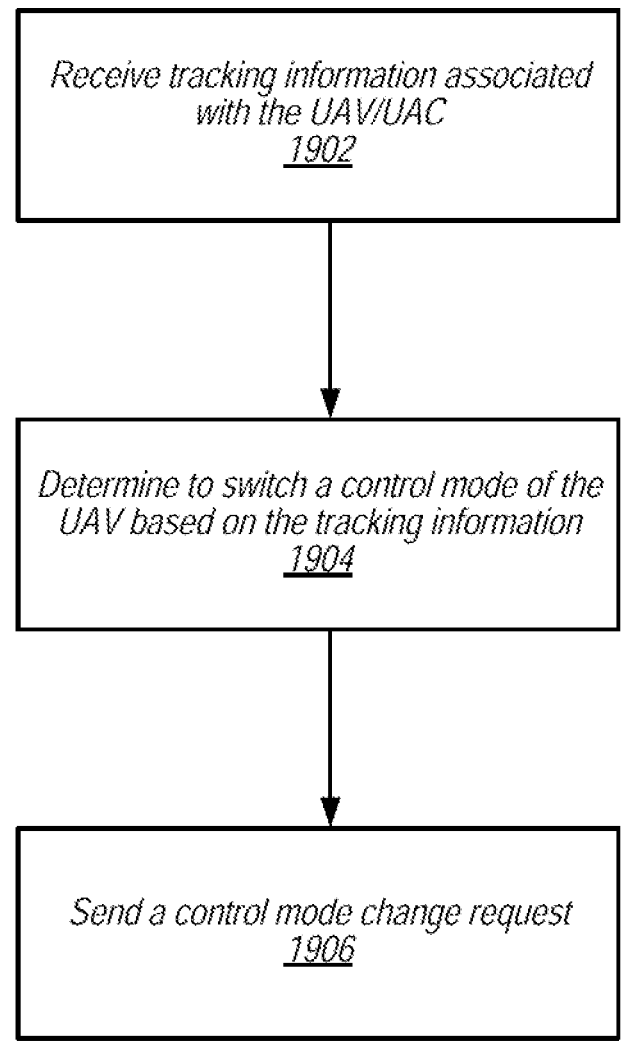
FIGS. 19-22 illustrate block diagrams of examples of methods for transferring control of an unmanned aerial vehicle (UAV) to an unmanned aerial system (UAS) traffic management system (UTM), according to some embodiments.

FIG. 19 illustrates a block diagram of an example of a method for transferring control of an unmanned aerial vehicle (UAV) to an unmanned aerial system (UAS) traffic management system (UTM), in some embodiments. The method shown in FIG. 19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, the UTM, such as UTM 108, may receive, from a network entity, such as AMF 704, tracking information associated with the UAV and/or a UAC associated with the UAV, e.g., such as UAV 132 and/or UAC 122. In some embodiments, the tracking information may include at least a UAV identifier (UAV ID) associated with the UAV and/or a UAC identifier (UAC ID) associated with the UAC. In some embodiments, the UAV may be in a first control mode in which a UAC controls the UAV via a cellular radio access network (RAN), e.g., such as a 5G RAN. In some embodiments, the first control mode may be a Network-Assisted control mode. In some embodiments, the UTM may be implemented by a computer system, e.g., a server, or in "the cloud" outside of (e.g., "behind") the cellular network, e.g., the radio access network. Thus, a server may implement UTM (UAS Traffic Management) functionality (which may be a combination of hardware and software) for coordinating operation and data traffic between one or more of the UAVs and one or more of the UAV controllers. It is noted that each cellular network provider may implement its own UTM. In some embodiments, the tracking information may be and/or include at least one of periodic tracking information and/or event tracking information.

In some embodiments, periodic tracking information may include at least one of (and/or any of, any combination of, and/or all of) UAV navigational properties, a cell identifier associated with the UAV, a tracking area code (TAC) identifier associated with the UAV, and/or global positioning system (GPS) information associated with the UAV. In some embodiments, UAV navigational properties may include one or more of (and/or any of, any combination of, and/or all of) UAV speed, UAV orientation, and/or UAV altitude. In some embodiments, GPS information may include one or more of (and/or any of, any combination of, and/or all of) a current position or location of the UAV and/or a destination location or destination coordinates of the UAV. In some embodiments, the periodic tracking information may further include at least one of (and/or any of, any combination of, and/or all of) a C2 link communication quality as reported by one of the UAV or UAC, a radio frequency measurement report as measured by one of the UAV or UAC, and/or radio resource control (RRC) status of the UAC.

In some embodiments, event tracking information may include a C2 communication mode change request and/or a cause code associated with the C2 communication mode change request. In some embodiments, the cause code may include at least one of (and/or any of, any combination of, and/or all of) a UAC control release cause code, a UAC control suspend cause code, a UAC control resume cause code, and/or a UAC lost cause code. In some embodiments, the UAC control release cause code may be associated with a power level of the UAC dropping below a threshold. In some embodiments, the UAC control suspend cause code may be associated with the UAC detecting and/or determining entry of the UAV into a designated area. In some embodiments, UTM-Navigated control mode may be required while in the designated area. In some embodiments, the UAC control resume cause code may be associated with the UAC detecting and/or determining exiting of the UAV from a designated area. In some embodiments, the UAC lost cause code may be associated with the UAV not receiving any C2 commands from the UAC within a specified period of time.

At 1904, the UTM may determine to switch the UAV from the first control mode to a second control mode, e.g., based on the tracking information. In some embodiments, the second control mode may include the UTM providing navigational control of the UAV. In some embodiments, the second control mode may a UTM-Navigated control mode. In some embodiments, determining to switch the UAV from the first control mode to the second control mode may include sending, based on a prior request, the tracking information associated with the UAV to a Third-Party Authorized Entity (TPAE) and receiving, from the TPAE, the control mode change request. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM.

In some embodiments, determining, based on the tracking information associated with the UAV, to switch the UAV from first control mode to the second control mode may include determining that the UAV is entering a designated area. In some embodiments, UTM-Navigated control mode may be required while in the designated area. In some embodiments, the designated area is specified by at least one of an air traffic control policy or a government policy.

In some embodiments, determining, based on the tracking information associated with the UAV, to switch the UAV from the first control mode to the second control mode may include determining that the UAC is unable to communicate with the UAV. In some embodiments, determining, based on the tracking information associated with the UAV, to switch the UAV from the first control mode to the second control mode may include determining that the UAC is initiating the switch based on at least one of a UAC control release cause code and/or a UAC control suspend cause code. In some embodiments, determining, based on the tracking information associated with the UAV, to switch the UAV from the first control mode to the second control mode may include determining that the UAV is initiating the switch based on a UAC lost cause code.

At 1906, the UTM may send, to the network entity, a control mode change request. In some embodiments, the control mode change request may include at least a UAV identifier (UAV ID) associated with the UAV and/or a UAC identifier (UAC ID) associated with the UAC. In some embodiments, the control mode change request may include an indication of a cause or reason for the control mode change request.

Figure 20:
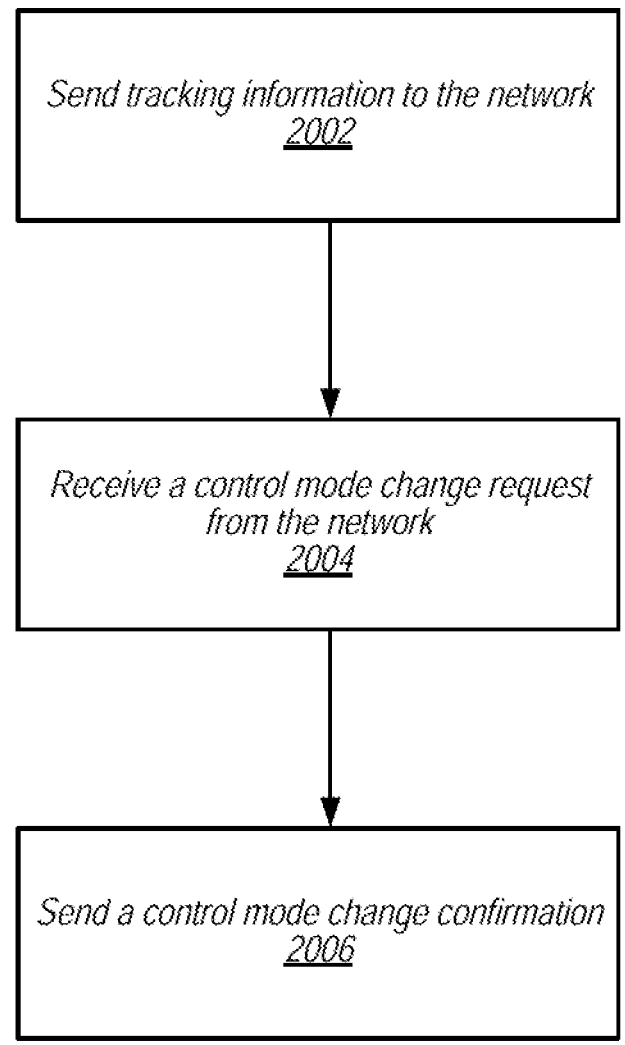

FIG. 20 illustrates a block diagram of a further example of a method for transferring control of an unmanned aerial vehicle (UAV) to an unmanned aerial system (UAS) traffic management system (UTM), in some embodiments. The method shown in FIG. 20 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2002, a UAV and/or a UAC, such as UAV 132 and/or UAC 122, may send (e.g., transmit) tracking information associated with the UAV and/or UAC to a network entity, such as AMF 704. In some embodiments, the network entity may forward the tracking information to a UTM, such as UTM 108. In some embodiments, the tracking information may include at least a UAV identifier (UAV ID) associated with the UAV and/or a UAC identifier (UAC ID) associated with the UAC. In some embodiments, the UAV may be in a first control mode in which a UAC controls the UAV via a cellular radio access network (RAN), e.g., such as a 5G RAN. In some embodiments, the first control mode may be a Network-Assisted control mode. In some embodiments, the UTM may be implemented by a computer system, e.g., a server, or in "the cloud" outside of (e.g., "behind") the cellular network, e.g., the radio access network. Thus, a server may implement UTM (UAS Traffic Management) functionality (which may be a combination of hardware and software) for coordinating operation and data traffic between one or more of the UAVs and one or more of the UAV controllers. It is noted that each cellular network provider may implement its own UTM. In some embodiments, the tracking information may be and/or include at least one of periodic tracking information and/or event tracking information.

In some embodiments, periodic tracking information may include at least one of (and/or any of, any combination of, and/or all of) UAV navigational properties, a cell identifier associated with the UAV, a tracking area code (TAC) identifier associated with the UAV, and/or global positioning system (GPS) information associated with the UAV. In some embodiments, UAV navigational properties may include one or more of (and/or any of, any combination of, and/or all of) UAV speed, UAV orientation, and/or UAV altitude. In some embodiments, GPS information may include one or more of (and/or any of, any combination of, and/or all of) a current position or location of the UAV and/or a destination location or destination coordinates of the UAV. In some embodiments, the periodic tracking information may further include at least one of (and/or any of, any combination of, and/or all of) a C2 link communication quality as reported by one of the UAV or UAC, a radio frequency measurement report as measured by one of the UAV or UAC, and/or radio resource control (RRC) status of the UAC.

In some embodiments, event tracking information may include a C2 communication mode change request and/or a cause code associated with the C2 communication mode change request. In some embodiments, the cause code may include at least one of (and/or any of, any combination of, and/or all of) a UAC control release cause code, a UAC control suspend cause code, a UAC control resume cause code, and/or a UAC lost cause code. In some embodiments, the UAC control release cause code may be associated with a power level of the UAC dropping below a threshold. In some embodiments, the UAC control suspend cause code may be associated with the UAC detecting and/or determining entry of the UAV into a designated area. In some embodiments, UTM-Navigated control mode may be required while in the designated area. In some embodiments, the UAC control resume cause code may be associated with the UAC detecting and/or determining exiting of the UAV from a designated area. In some embodiments, the UAC lost cause code may be associated with the UAV not receiving any C2 commands from the UAC within a specified period of time.

At 2004, the UAV and/or UAC may receive a control mode change request from the network entity. In some embodiments, the control mode change request may be forwarded by the network entity on behalf of the UTM (e.g., the UTM may send the control mode change request to the network entity and the network entity may forward the control mode change request to the UAV and/or UAC). In some embodiments, the UTM may determine to switch the UAV from the first control mode to a second control mode, e.g., based on the tracking information. In some embodiments, the second control mode may include the UTM providing navigational control of the UAV. In some embodiments, the second control mode may a UTM-Navigated control mode. In some embodiments, the UTM may send, based on a prior request, the tracking information associated with the UAV to a Third-Party Authorized Entity (TPAE) and receive, from the TPAE, the control mode change request. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM.

In some embodiments, the UTM may determine to switch the UAV from first control mode to the second control mode based on determining that the UAV is entering a designated area. In some embodiments, UTM-Navigated control mode may be required while in the designated area. In some embodiments, the designated area is specified by at least one of an air traffic control policy or a government policy.

In some embodiments, the UTM may determine to switch the UAV from first control mode to the second control mode based on determining that the UAC is unable to communicate with the UAV. In some embodiments, the UTM may determine to switch the UAV from first control mode to the second control mode based on determining that the UAC is initiating the switch based on at least one of a UAC control release cause code and/or a UAC control suspend cause code. In some embodiments, the UTM may determine to switch the UAV from first control mode to the second control mode based on determining that the UAV is initiating the switch based on a UAC lost cause code.

At 2006, the UAV and/or UAC may send, to the network entity, a control mode change confirmation. In some embodiments, the control mode change confirmation may include at least a UAV identifier (UAV ID) associated with the UAV and/or a UAC identifier (UAC ID) associated with the UAC.

Figure 21:
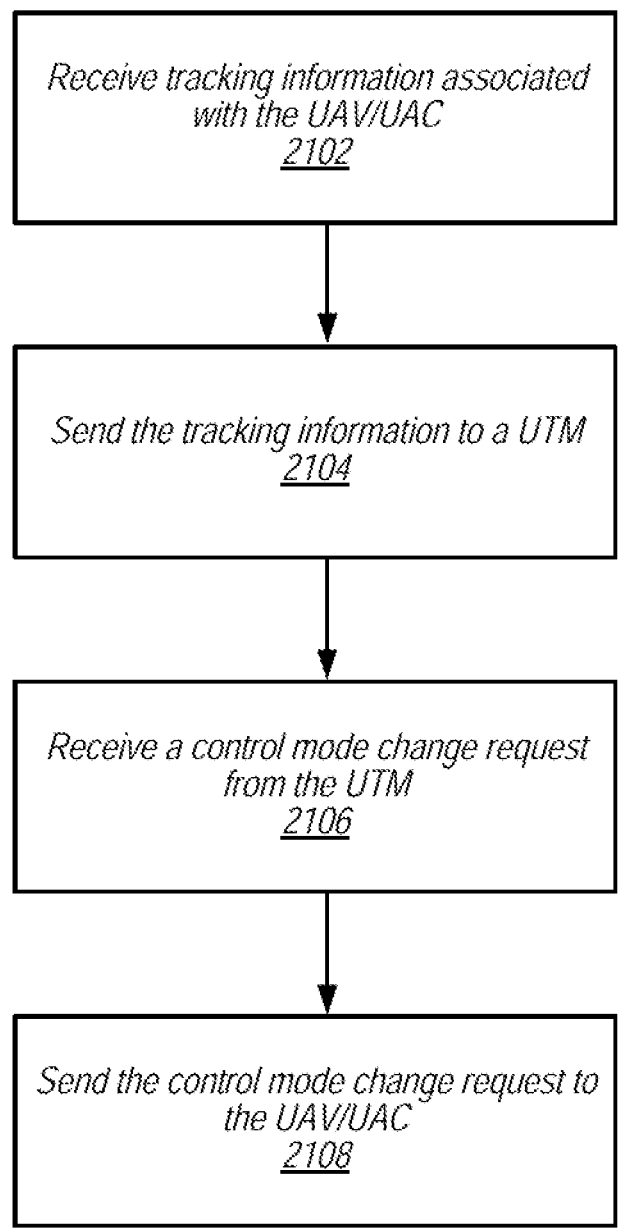

FIG. 21 illustrates a block diagram of a further example of a method for transferring control of an unmanned aerial vehicle (UAV) to an unmanned aerial system (UAS) traffic management system (UTM), in some embodiments. The method shown in FIG. 21 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, a network entity, such as AMF 704, may receive tracking information associated with a UAV and/or a UAC, such as UAV 132 and/or UAC 122, from the UAV and/or UAC. In some embodiments, the tracking information may include at least a UAV identifier (UAV ID) associated with the UAV and/or a UAC identifier (UAC ID) associated with the UAC. In some embodiments, the UAV may be in a first control mode in which a UAC controls the UAV via a cellular radio access network (RAN), e.g., such as a 5G RAN. In some embodiments, the first control mode may be a Network-Assisted control mode. In some embodiments, the tracking information may be and/or include at least one of periodic tracking information and/or event tracking information.

In some embodiments, periodic tracking information may include at least one of (and/or any of, any combination of, and/or all of) UAV navigational properties, a cell identifier associated with the UAV, a tracking area code (TAC) identifier associated with the UAV, and/or global positioning system (GPS) information associated with the UAV. In some embodiments, UAV navigational properties may include one or more of (and/or any of, any combination of, and/or all of) UAV speed, UAV orientation, and/or UAV altitude. In some embodiments, GPS information may include one or more of (and/or any of, any combination of, and/or all of) a current position or location of the UAV and/or a destination location or destination coordinates of the UAV. In some embodiments, the periodic tracking information may further include at least one of (and/or any of, any combination of, and/or all of) a C2 link communication quality as reported by one of the UAV or UAC, a radio frequency measurement report as measured by one of the UAV or UAC, and/or radio resource control (RRC) status of the UAC.

In some embodiments, event tracking information may include a C2 communication mode change request and/or a cause code associated with the C2 communication mode change request. In some embodiments, the cause code may include at least one of (and/or any of, any combination of, and/or all of) a UAC control release cause code, a UAC control suspend cause code, a UAC control resume cause code, and/or a UAC lost cause code. In some embodiments, the UAC control release cause code may be associated with a power level of the UAC dropping below a threshold. In some embodiments, the UAC control suspend cause code may be associated with the UAC detecting and/or determining entry of the UAV into a designated area. In some embodiments, UTM-Navigated control mode may be required while in the designated area. In some embodiments, the UAC control resume cause code may be associated with the UAC detecting and/or determining exiting of the UAV from a designated area. In some embodiments, the UAC lost cause code may be associated with the UAV not receiving any C2 commands from the UAC within a specified period of time.

At 2104, the network entity may send (e.g., transmit) the tracking information to a UTM, such as UTM 108. In some embodiments, the UTM may be implemented by a computer system, e.g., a server, or in "the cloud" outside of (e.g., "behind") the cellular network, e.g., the radio access network. Thus, a server may implement UTM (UAS Traffic Management) functionality (which may be a combination of hardware and software) for coordinating operation and data traffic between one or more of the UAVs and one or more of the UAV controllers. It is noted that each cellular network provider may implement its own UTM.

At 2106, the network entity may receive a control mode change request from the UTM. In some embodiments, the UTM may determine to switch the UAV from the first control mode to a second control mode, e.g., based on the tracking information. In some embodiments, the second control mode may include the UTM providing navigational control of the UAV. In some embodiments, the second control mode may a UTM-Navigated control mode. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM.

In some embodiments, the UTM may determine to switch the UAV from first control mode to the second control mode based on determining that the UAV is entering a designated area. In some embodiments, UTM-Navigated control mode may be required while in the designated area. In some embodiments, the designated area is specified by at least one of an air traffic control policy or a government policy.

In some embodiments, the UTM may determine to switch the UAV from first control mode to the second control mode based on determining that the UAC is unable to communicate with the UAV. In some embodiments, the UTM may determine to switch the UAV from first control mode to the second control mode based on determining that the UAC is initiating the switch based on at least one of a UAC control release cause code and/or a UAC control suspend cause code. In some embodiments, the UTM may determine to switch the UAV from first control mode to the second control mode based on determining that the UAV is initiating the switch based on a UAC lost cause code.

At 2108, the network entity may send (e.g., transmit), to the UAV and/or UAC, the control mode change request. In some embodiments, the control mode change request may include at least a UAV identifier (UAV ID) associated with the UAV and/or a UAC identifier (UAC ID) associated with the UAC. In some embodiments, the control mode change request may include an indication of a cause or reason for the control mode change request.

In some embodiments, the network entity may receive, from the UAV and/or UAC, a control mode change confirmation. In some embodiments, the control mode change confirmation may include at least a UAV identifier (UAV ID) associated with the UAV and/or a UAC identifier (UAC ID) associated with the UAC.

Figure 22:
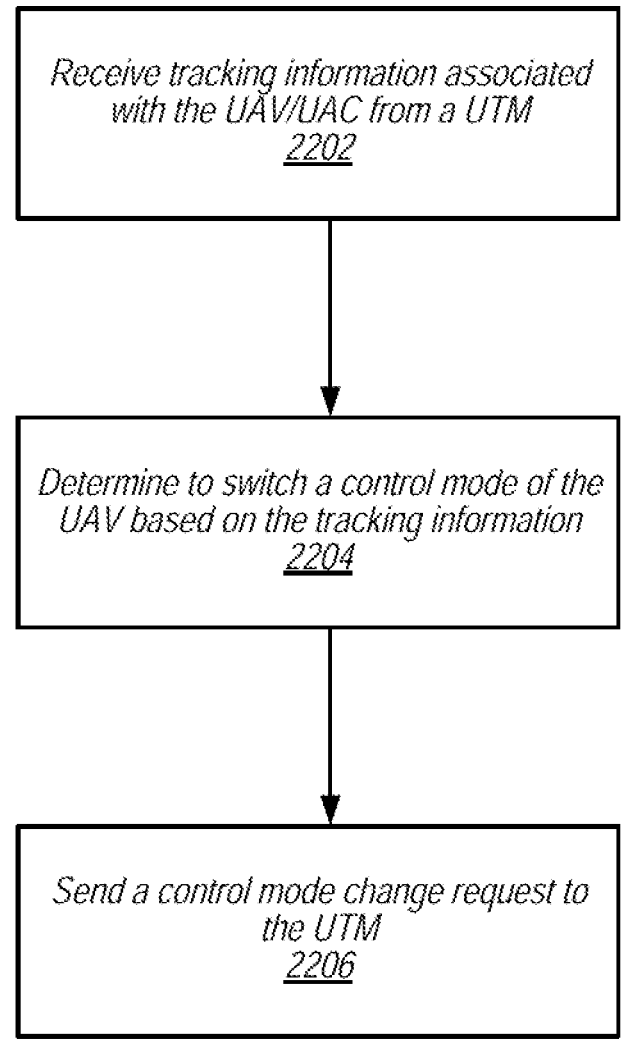

FIG. 22 illustrates a block diagram of yet another example of a method for transferring control of an unmanned aerial vehicle (UAV) to an unmanned aerial system (UAS) traffic management system (UTM), in some embodiments. The method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a Third-Party Authorized Entity (TPAE) may receive, from a UTM, such as UTM 108, tracking information associated with the UAV and/or a UAC associated with the UAV, e.g., such as UAV 132 and/or UAC 122. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM. In some embodiments, the tracking information may include at least a UAV identifier (UAV ID) associated with the UAV and/or a UAC identifier (UAC ID) associated with the UAC. In some embodiments, the UAV may be in a first control mode in which a UAC controls the UAV via a cellular radio access network (RAN), e.g., such as a 5G RAN. In some embodiments, the first control mode may be a Network-Assisted control mode. In some embodiments, the UTM may be implemented by a computer system, e.g., a server, or in "the cloud" outside of (e.g., "behind") the cellular network, e.g., the radio access network. Thus, a server may implement UTM (UAS Traffic Management) functionality (which may be a combination of hardware and software) for coordinating operation and data traffic between one or more of the UAVs and one or more of the UAV controllers. It is noted that each cellular network provider may implement its own UTM. In some embodiments, the tracking information may be and/or include at least one of periodic tracking information and/or event tracking information.

In some embodiments, periodic tracking information may include at least one of (and/or any of, any combination of, and/or all of) UAV navigational properties, a cell identifier associated with the UAV, a tracking area code (TAC) identifier associated with the UAV, and/or global positioning system (GPS) information associated with the UAV. In some embodiments, UAV navigational properties may include one or more of (and/or any of, any combination of, and/or all of) UAV speed, UAV orientation, and/or UAV altitude. In some embodiments, GPS information may include one or more of (and/or any of, any combination of, and/or all of) a current position or location of the UAV and/or a destination location or destination coordinates of the UAV. In some embodiments, the periodic tracking information may further include at least one of (and/or any of, any combination of, and/or all of) a C2 link communication quality as reported by one of the UAV or UAC, a radio frequency measurement report as measured by one of the UAV or UAC, and/or radio resource control (RRC) status of the UAC.

In some embodiments, event tracking information may include a C2 communication mode change request and/or a cause code associated with the C2 communication mode change request. In some embodiments, the cause code may include at least one of (and/or any of, any combination of, and/or all of) a UAC control release cause code, a UAC control suspend cause code, a UAC control resume cause code, and/or a UAC lost cause code. In some embodiments, the UAC control release cause code may be associated with a power level of the UAC dropping below a threshold. In some embodiments, the UAC control suspend cause code may be associated with the UAC detecting and/or determining entry of the UAV into a designated area. In some embodiments, UTM-Navigated control mode may be required while in the designated area. In some embodiments, the UAC control resume cause code may be associated with the UAC detecting and/or determining exiting of the UAV from a designated area. In some embodiments, the UAC lost cause code may be associated with the UAV not receiving any C2 commands from the UAC within a specified period of time.

At 2204, the TPAE may determine to switch the UAV from the first control mode to a second control mode, e.g., based on the tracking information. In some embodiments, the second control mode may include the UTM providing navigational control of the UAV. In some embodiments, the second control mode may a UTM-Navigated control mode.

In some embodiments, determining, based on the tracking information associated with the UAV, to switch the UAV from first control mode to the second control mode may include determining that the UAV is entering a designated area. In some embodiments, UTM-Navigated control mode may be required while in the designated area. In some embodiments, the designated area is specified by at least one of an air traffic control policy or a government policy.

In some embodiments, determining, based on the tracking information associated with the UAV, to switch the UAV from the first control mode to the second control mode may include determining that the UAC is unable to communicate with the UAV. In some embodiments, determining, based on the tracking information associated with the UAV, to switch the UAV from the first control mode to the second control mode may include determining that the UAC is initiating the switch based on at least one of a UAC control release cause code and/or a UAC control suspend cause code. In some embodiments, determining, based on the tracking information associated with the UAV, to switch the UAV from the first control mode to the second control mode may include determining that the UAV is initiating the switch based on a UAC lost cause code.

At 2206, the TPAE may send, to the UTM, a control mode change request. In some embodiments, the control mode change request may include at least a UAV identifier (UAV ID) associated with the UAV and/or a UAC identifier (UAC ID) associated with the UAC. In some embodiments, the control mode change request may include an indication of a cause or reason for the control mode change request.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer readable memory medium storing program instructions executable by processing circuitry to cause a processor to:
   receive, from a network entity, tracking information associated with an unmanned aerial vehicle (UAV) and/or a UAV controller (UAC) associated with the UAV, wherein the UAV is in a Network-Assisted control mode, and wherein the tracking information includes at least one of a UAV identifier (UAV ID) associated with the UAV or a UAC identifier (UAC ID) associated with the UAC;
   determine, based on the tracking information associated with the UAV, to switch the UAV from the Network-Assisted control mode to a UTM-Navigated control mode; and
   send, to the network entity, a control mode change request, wherein the control mode change request includes a cause code and at least one of the UAV ID or UAC ID.

2. The non-transitory memory medium of claim 1,
   wherein, to determine to switch the UAV from the Network-Assisted control mode to the UTM-Navigated control mode, the program instructions are further executable to:
   send, based on a prior request, the tracking information associated with the UAV to a Third-Party Authorized Entity (TPAE); and
   receive, from the TPAE, the control mode change request.

3. The non-transitory memory medium of claim 1,
   wherein the control mode change request includes an indication of a cause or reason for the control mode change request.

4. The non-transitory memory medium of claim 1,
   wherein, to determine, based on the tracking information associated with the UAV, to switch the UAV from the Network-Assisted control mode to the UTM-Navigated control mode, the program instructions are further executable to:
   determine that the UAV is entering a designated area, wherein UTM-Navigated control mode is required while in the designated area, and wherein the designated area is specified by at least one of an air traffic control policy or a government policy.

5. The non-transitory memory medium of claim 1,
   wherein, to determine, based on the tracking information associated with the UAV, to switch the UAV from the Network-Assisted control mode to the UTM-Navigated control mode, the program instructions are further executable to:
   determine at least one of:
      that the UAC is unable to communicate with the UAV;
      that the UAC is initiating the switch based on at least one of a UAC control release cause code or a UAC control suspend cause code; or
      that the UAV is initiating the switch based on a UAC lost cause code.

6. The non-transitory memory medium of claim 1,
   wherein the tracking information is at least one of periodic tracking information or event tracking information.

7. The non-transitory memory medium of claim 6,
   wherein periodic tracking information includes at least one of:
      UAV navigational properties;
      a cell identifier associated with the UAV;
      a tracking area code (TAC) identifier associated with the UAV;
      global positioning system (GPS) information associated with the UAV;
      a C2 link communication quality as reported by one of the UAV or UAC;
      a radio frequency measurement report as measured by one of the UAV or UAC; or
      radio resource control (RRC) status of the UAC.

8. The non-transitory memory medium of claim 7,
   wherein UAV navigational properties includes one or more of:
      UAV speed;
      UAV orientation; or
      UAV altitude; and
   wherein GPS information includes one or more of:
      a current position or location of the UAV; or
      a destination location or destination coordinates of the UAV.

9. The non-transitory memory medium of claim 6,
   wherein event tracking information includes:
      a C2 communication mode change request; and
      a cause code associated with the C2 communication mode change request; and
   wherein the cause code includes at least one of:
      a UAC control release cause code;
      a UAC control suspend cause code;
      a UAC control resume cause code; or
      a UAC lost cause code.

10. An apparatus, comprising:
a memory; and
a processing element in communication with the memory, wherein the processing element is configured to:
  receive, from a network entity, tracking information associated with an unmanned aerial vehicle (UAV) and/or a UAV controller (UAC) associated with the UAV, wherein the UAV is in a first control mode supported by communications between the UAV and the UAC via a radio access network, and wherein the tracking information includes at least one of a UAV identifier (UAV ID) associated with the UAV or a UAC identifier (UAC ID) associated with the UAC;
  determine, based on the tracking information associated with the UAV, to switch the UAV from the first control mode to a second control mode, wherein the second control mode is supported by communications between the UAV and the apparatus; and
  send, to the network entity, a control mode change request, wherein the control mode change request includes a cause code for the control mode change request and at least one of the UAV ID or UAC ID, and wherein the cause code is associated with a power level of the UAC dropping below a threshold.

11. The apparatus of claim 10,
wherein the cause code is a first cause code, wherein a second cause code is associated with the UAC detecting or determining entry of the UAV into a designated area, wherein a third cause code is associated with the UAC detecting or determining exiting of the UAV from a designated area, and wherein a fourth cause code is associated with the UAV not receiving any C2 commands from the UAC within a specified period of time.

12. The apparatus of claim 10,
wherein the tracking information is at least one of periodic tracking information or event tracking information.

13. The apparatus of claim 12,
wherein periodic tracking information includes at least one of:
  UAV navigational properties;
  a cell identifier associated with the UAV;
  a tracking area code (TAC) identifier associated with the UAV;
  global positioning system (GPS) information associated with the UAV;
  a C2 link communication quality as reported by one of the UAV or UAC;
  a radio frequency measurement report as measured by one of the UAV or UAC; or
  radio resource control (RRC) status of the UAC; and
wherein event tracking information includes:
  a C2 communication mode change request; and
  a cause code associated with the C2 communication mode change request.

14. The apparatus of claim 13,
wherein UAV navigational properties includes one or more of:
  UAV speed;
  UAV orientation; or
  UAV altitude; and
wherein GPS information includes one or more of:
  a current position or location of the UAV; or
  a destination location or destination coordinates of the UAV.

15. A unmanned aerial vehicle (UAV), comprising:
one or more antennas;
one or more radios, wherein each of the one or more radios is configured to perform cellular communication using at least one radio access technology (RAT);
one or more processors coupled to the one or more radios, wherein the one or more processors and the one or more radios are configured to perform voice and/or data communications;
wherein the one or more processors are configured to cause the UAV to:
  send, to a network entity, tracking information associated with the UAV and/or a UAV controller (UAC) associated with the UAV, wherein the UAV is in a Network-Assisted control mode, and wherein the tracking information includes at least one of a UAV identifier (UAV ID) associated with the UAV or a UAC identifier (UAC ID) associated with the UAC;
  receive, from the network entity, a control mode change request indicating a switch of the UAV from the Network-Assisted control mode to a UTM-Navigated control mode, wherein the control mode change request includes at least one of the UAV ID or UAC ID; and
  send, to the network entity, a control mode change confirmation, wherein the control mode change request includes a cause code for the control mode change request and at least one of the UAV ID or UAC ID, and wherein the cause code is associated with the UAV not receiving any command and control (C2) communications from the UAC within a specified period of time.

16. The UAV of claim 15,
wherein the tracking information includes event-based tracking information, and wherein the event-based tracking information includes:
  a C2 communication mode change request; and
  a cause code associated with the C2 communication mode change request; and
wherein the cause code includes at least one of:
  a UAC control release cause code;
  a UAC control suspend cause code;
  a UAC control resume cause code; or
  a UAC lost cause code.

17. The UAV of claim 16,
wherein the UAC control release cause code is associated with a power level of the UAC dropping below a threshold;
wherein the UAC control suspend cause code is associated with the UAC detecting or determining entry of the UAV into a designated area, wherein UTM-Navigated control mode is required while in the designated area;
wherein the UAC control resume cause code is associated with the UAC detecting or determining exiting of the UAV from a designated area, wherein UTM-Navigated control mode is required while in the designated area;
wherein the UAC lost cause code is associated with the UAV not receiving any C2 commands from the UAC within a specified period of time; and
wherein the designated area is specified by at least one of an air traffic control policy or a government policy.

18. The UAV of claim 15,
wherein the tracking information includes periodic tracking information, and wherein the periodic tracking information includes at least one of:
  UAV navigational properties;
  a cell identifier associated with the UAV;
  a tracking area code (TAC) identifier associated with the UAV;
  global positioning system (GPS) information associated with the UAV;
  a C2 link communication quality as reported by one of the UAV or UAC;
  a radio frequency measurement report as measured by one of the UAV or UAC; or
  radio resource control (RRC) status of the UAC.

19. The UAV of claim 18,
wherein UAV navigational properties includes one or more of:
  UAV speed;
  UAV orientation; or
  UAV altitude.

20. The UAV of claim 15,
wherein GPS information includes one or more of:
  a current position or location of the UAV; or
  a destination location or destination coordinates of the UAV.

* * * * *